(12) United States Patent
Yamaguchi et al.

(10) Patent No.: US 9,175,403 B2
(45) Date of Patent: Nov. 3, 2015

(54) COMPOSITION FOR ADHESION LAYER USED FOR MULTI-LAYERED SURFACE-TREATMENT STEEL SHEET

(75) Inventors: Hidehiro Yamaguchi, Tokyo (JP); Shigeki Yamamoto, Tokyo (JP); Tomohiro Iko, Tokyo (JP); Wei Li, Tokyo (JP)

(73) Assignee: NIHON PARKERIZING CO., LTD., Tokyo (JP)

(*) Notice: Subject to any disclaimer, the term of this patent is extended or adjusted under 35 U.S.C. 154(b) by 212 days.

(21) Appl. No.: 13/394,304

(22) PCT Filed: Sep. 11, 2009

(86) PCT No.: PCT/JP2009/065902
§ 371 (c)(1),
(2), (4) Date: Apr. 5, 2012

(87) PCT Pub. No.: WO2011/030439
PCT Pub. Date: Mar. 17, 2011

(65) Prior Publication Data
US 2012/0190790 A1 Jul. 26, 2012

(51) Int. Cl.
| | |
|---|---|
| C08G 18/02 | (2006.01) |
| C23C 28/00 | (2006.01) |
| B32B 7/12 | (2006.01) |
| B32B 15/08 | (2006.01) |
| C08G 18/08 | (2006.01) |
| C08G 18/12 | (2006.01) |
| C08G 18/32 | (2006.01) |
| C08G 18/42 | (2006.01) |
| C08G 18/66 | (2006.01) |
| C08G 18/73 | (2006.01) |
| C08G 18/75 | (2006.01) |
| C09D 5/08 | (2006.01) |
| C09J 175/04 | (2006.01) |
| B05D 5/10 | (2006.01) |
| B05D 7/14 | (2006.01) |

(52) U.S. Cl.
CPC . *C23C 28/00* (2013.01); *B32B 7/12* (2013.01); *B32B 15/08* (2013.01); *C08G 18/0809* (2013.01); *C08G 18/0814* (2013.01); *C08G 18/12* (2013.01); *C08G 18/3275* (2013.01); *C08G 18/4213* (2013.01); *C08G 18/4222* (2013.01); *C08G 18/4238* (2013.01); *C08G 18/6655* (2013.01); *C08G 18/73* (2013.01); *C08G 18/755* (2013.01); *C08G 18/757* (2013.01); *C08G 18/758* (2013.01); *C09D 5/08* (2013.01); *C09J 175/04* (2013.01); *B05D 5/10* (2013.01); *B05D 7/14* (2013.01); *B32B 2605/00* (2013.01); *C08G 2170/80* (2013.01)

(58) Field of Classification Search
CPC ..................................................... C23C 28/00
USPC ........................................................... 528/71
See application file for complete search history.

(56) References Cited

U.S. PATENT DOCUMENTS

| | | | |
|---|---|---|---|
| 5,075,165 A | 12/1991 | Kishi et al. | |
| 5,733,605 A | 3/1998 | Akiyama et al. | |
| 2004/0167266 A1* | 8/2004 | Hasegawa et al. | 524/406 |

FOREIGN PATENT DOCUMENTS

| | | |
|---|---|---|
| CN | 1520468 A | 8/2004 |
| JP | A-02-305995 | 12/1990 |
| JP | A-09-111183 | 4/1997 |
| JP | A-09-234414 | 9/1997 |
| JP | A-2000-001647 | 1/2000 |
| JP | A-2000-102765 | 4/2000 |
| JP | A-2000-119353 | 4/2000 |
| JP | A-2000-144048 | 5/2000 |
| JP | A-2000-173816 | 6/2000 |
| JP | A-2001-009368 | 1/2001 |
| JP | A-2001-059184 | 3/2001 |
| JP | A-2001-064346 | 3/2001 |
| JP | A-2004-018887 | 1/2004 |
| JP | A-2004-204333 | 7/2004 |
| JP | A-2006-077077 | 3/2006 |
| JP | A-2006-152436 | 6/2006 |
| JP | A-2006-239622 | 9/2006 |
| JP | A-2006-328445 | 12/2006 |
| JP | A-2007-038652 | 2/2007 |
| JP | A-2007-051323 | 3/2007 |
| JP | A-2007-075777 | 3/2007 |
| JP | A-2007-204847 | 8/2007 |
| JP | A-2008-025023 | 2/2008 |
| JP | A-2009-275287 | 11/2009 |

OTHER PUBLICATIONS

International Search Report issued in International Application No. PCT/JP2009/065902 Dated Dec. 15, 2009 (with trans).
Jan. 21, 2014 Notice of Reasons for Refusal issued in Japanese Application No. 2011-530693 with partial English-language translation.
Sep. 2, 2014 Office Action issued in Taiwanese Patent Application No. 099130199 (with translation).

\* cited by examiner

*Primary Examiner* — Kuo-Liang Peng
(74) *Attorney, Agent, or Firm* — Oliff PLC

(57) ABSTRACT

A composition for adhesion layer that is used for obtaining a multi-layered surface treatment steel sheet in which an adhesion layer is formed onto at least one surface of the steel sheet, and an upper layer and/or an intermediate layer which has a design and which contains a rust preventive pigment and/or a colored pigment is formed onto the adhesion layer; the composition including a cationic urethane resin and a silicon compound in an aqueous medium, and the ratio between the temperature at which the logarithmic decrement for the mixture of the cationic urethane resin and the silicon compound in the rigid-body pendulum type free damped vibration method shows the maximum value and the temperature at which the logarithmic decrement for the cationic urethane resin alone in the rigid-body pendulum type free damped vibration method shows the maximum value is in the range of 1.2 to 3.0.

6 Claims, 2 Drawing Sheets

COMPOSITION FOR ADHESION LAYER USED FOR MULTI-LAYERED SURFACE-TREATMENT STEEL SHEET

FIELD OF THE INVENTION

This invention relates to a composition for adhesion layer used for multi-layered surface-treatment steel sheet. More particularly, this invention relates to a composition for the adhesion layer which is used for forming an adhesion layer which can provide an extremely excellent adhesiveness to a coating film for the surface of steel sheet, and which adhesiveness is not ruined even if the coating film which has received any scratches or flaws, any working loads, or the like is exposed to corrosive environment, in a field of the multi-layered surface-treatment steel sheet wherein an elaborately designed coating film is provided onto the steel sheet via an adhesion layer and which is used for construction materials, home appliance or auto parts, etc.

BACKGROUND ART

As for pre-coated metallic material (i.e., metallic material which is provided with a pre-coating. This is the same in the following description.), many characteristics of coating film such as adhesion on working, corrosion resistance, chemical resistance, coin-scratch resistance, design, etc. are demanded. Therefore, two coat type wherein the undercoating that is called a primer is applied onto a metallic sheet which underwent surface treatment in advance, and a colored topcoating is further applied thereon has been widely used. In such a pre-coated metallic material, the adhesiveness to the metallic sheet is secured by providing the surface treatment, and further the adhesion on working, corrosion resistance, coin-scratch resistance, etc., are given by providing the primer which includes resin and rust preventive pigment between the metallic sheet and topcoating.

As the surface treatment for the pre-coated metallic material, chromate treatment with a treating solution which includes chromic acid, a dichromic acid or those salts as a main ingredient has been used in order to provide a good adhesiveness to the surface of the metallic material and to provide an excellent corrosion resistance to the surface of the metallic material. Further, as for the primer, paints which include chromic rust preventive pigment have been widely used in order to obtain an excellent corrosion resistance. However, in recent consideration of the environmental friendliness, chrome-free treatment or paint wherein another cross-linkable metal is used as a substitute for chrome is practically used today.

In the Patent Literature 1, the disclosed is a process for manufacturing one coat type pre-coated steel sheet which has excellent workability, corrosion resistance, adhesion, impact resistance, and scratch resistance, wherein the process is comprised of coating a paint composition which is prepared by blending a polyester resin, a melamine resin curing agent, a rust preventive pigment, organic polymer minute particles, etc., onto a zinc plated steel sheet which underwent chemical conversion treatment in advance. However, owing to the presence of the rust preventive pigment in the paint composition, the appearance of the coating obtained is compelled to deteriorate. As the result, a problem that various designs can not be given to the pre-coated steel sheet arises. Moreover, since this paint composition is applied to the chromate-treated steel sheet, the process comes off the request in the age.

In the Patent Literature 2, the disclosed is a process for manufacturing one coat type pre-coated steel sheet which has an excellent molding workability, wherein the process is comprised of coating a solvent type paint composition which is prepared by blending a polyester resin, an epoxy resin, a blocked polyisocyanate compound, a melamine resin curing agent, etc., onto a zinc type plated steel sheet which underwent chemical conversion treatment in advance. However, since this paint composition is also applied to the chromate-treated steel sheet, the process comes off the request in the age. In addition, when this paint composition is coated to the steel sheet which underwent chemical conversion treatment including the chromate treatment in advance, the obtained pre-coated steel sheet can not have a sufficient corrosion resistance because the formed organic coating film includes no rust-inhibitor.

In the Patent Literature 3, the disclosed is an aqueous primer-cum-surface treating agent for pre-coated steel sheet which includes an aqueous organic resin ingredient, a condensed sodium phosphate, an aluminum tripolyphosphate, a metallic oxysalt, and a phosphoric acid or an aqueous phosphate, and there is a description that the coating film which excels in the corrosion resistance and the workability can be obtained without using a chromate type rust preventive pigment. However, since the coating film formed with this treating agent does not show sufficient compactness and toughness, the coin-scratch resistance and the chemical resistance of the coating film become insufficient.

In the Patent Literature 4, the disclosed is a coating method which is characterized by coating an aqueous paint composition which includes an acrylic epoxy resin and a rust preventive pigment to a metallic substrate which did not undergo chemical conversion treatment in advance, and by which the coating film having an excellent adhesiveness equal to that of the coating film which is accompanied by a chemical conversion coating film can be formed. However, the adhesion on working of the coating film obtained by this paint composition does not attain the level demanded from the pre-coated steel sheet. In addition, the chemical resistance of the coating film obtained by this paint composition is also insufficient.

In the Patent Literature 5, the disclosed is a metallic surface treating agent which includes a urethane resin, a specific organic compound and zirconium compound, and a metallic material which is prepared by using the above-mentioned agent and which has excellent corrosion resistance, molding workability, chemical resistance and moisture resistance. However, this surface treating agent is intended to be used for the purpose of rust prevention of a metallic material used in a non-painted condition. Therefore, even when this metallic surface treating agent is used for another purpose of forming an undercoating for paint layer, the adhesion on working and the coin-scratch resistance of the coating film obtained by using this surface treating agent does not attain the level demanded from the pre-coated steel sheet.

On the other hand, the methods of obtaining corrosion resistance and lubricity, etc., with various resin ingredients and various additives are disclosed in the Patent Literatures 6-13. Moreover, the adhesiveness with the paint is stated in these inventions. However, the adhesiveness of these invention are the ones at the level of obtaining the adhesion in the cross-cut adhesion test parts, but not the one that the extremely excellent adhesiveness which is provided by the present invention.

Incidentally, since the pre-coated steel sheet necessitates the adhesion on working of the coating film which can endure a severe post-processing such as bending or drawing, a surface treatment coating is usually provided on the steel sheet. The surface treatment coating plays the role to give an excellent adhesion on working of the coating film by linking the upper layers (primer and topcoating) to the surface of metal via the surface treatment coating, whereas a sufficient adhesion of the upper layers directly with the surface of metal can be hardly obtained. Herein, the bending test which is an extremely severe test has been adopted in order to evaluate the adhesion on working of the pre-coated steel.

Further, as for pre-coated steel sheet, corrosion resistance which can endure a long term exposure is required. The corrosion on the pre-coated steel sheet comprises mainly the anodic dissolution at the scratched portions or end face parts, and the generation of blister originated in cathodic reaction which is caused below the coating film at a portion little away from the scratched portion. In the case of the two coat type pre-coated steel sheet, the corrosion resistance given by the surface treatment is implemented by the fact that the coating formed thereby has a strong resistance to acids and a strong resistance to alkalis, and the corrosion resistance given by the primer is implemented by the environmental deprivation ability, such as the low water permeability, of the coating, and the inhibitor effect due to the rust preventive pigment which abundantly contains in the coating. In addition, it is also an important characteristic that an excellent anti-scratching property (coin-scratch resistance) brought by the hard coating of the primer contributes to degression in opportunities of generating starting points of corrosion. The corrosion resistance given by the topcoating is implemented by the environmental deprivation ability due to the thick film thickness of the coating which employs a resin having a strong anti-pollution property.

In addition, various designs are demanded from the pre-coated steel sheet. For instance, the topcoatings according to the purposes, such as a lustrous beautiful appearance, or a mat finish with a low-gloss may be applied.

PRIOR ART REFERENCES

Patent Document

| | |
|---|---|
| [Patent Document 1] | Japanese Laid-Open Patent Application No. H09-111183 A |
| [Patent Document 2] | Japanese Laid-Open Patent Application No. 2001-9368 A |
| [Patent Document 3] | Japanese Laid-Open Patent Application No. 2006-77077 A |
| [Patent Document 4] | Japanese Laid-Open Patent Application No. 2006-239622 A |
| [Patent Document 5] | Japanese Laid-Open Patent Application No. 2007-51323 A |
| [Patent Document 6] | Japanese Laid-Open Patent Application No. 2000-1647 A |
| [Patent Document 7] | Japanese Laid-Open Patent Application No. 2000-102765 A |
| [Patent Document 8] | Japanese Laid-Open Patent Application No. 2000-119353 A |
| [Patent Document 9] | Japanese Laid-Open Patent Application No. 2000-144048 A |
| [Patent Document 10] | Japanese Laid-Open Patent Application No. 2001-64346 A |
| [Patent Document 11] | Japanese Laid-Open Patent Application No. 2007-38652 A |
| [Patent Document 12] | Japanese Laid-Open Patent Application No. 2007-75777 A |
| [Patent Document 13] | Japanese Laid-Open Patent Application No. 2008-25023 A |

SUMMARY OF THE INVENTION

The Problems Solved by the Invention

As described above, the layers of the paint coating on the pre-coated steel sheet own their individual roles, and it is required that the adhesion layer provided on the steel sheet shows a extremely strong adhesiveness which is influenced by neither the kind of the steel sheet nor the kind of the paint, as well as by neither the variable usage environment nor the variable metal working mode. However, an aqueous surface treating agent which can form such an adhesion layer have not been developed as yet. In addition, an aqueous surface treating agent of which adhesiveness is not ruined even if the coating film which has any scratches or flaws, any machining stresses, or the like is exposed to the corrosive environment have not been developed as yet, either.

The present invention aims to solve the problems in the prior art, and a purpose of the present invention is to provide a composition for forming adhesion layer which is used for forming an adhesion layer which can provide an extremely strong adhesiveness to an coating film for the surface of steel sheet, wherein the adhesiveness is influenced by neither the kind of the steel sheet about the multi-layered surface-treatment steel sheet with a certain design nor the kind of the paint, as well as by neither the variable usage environment nor the variable metal working mode, and wherein the adhesiveness is not ruined even if the coating film which has received any scratches or flaws, any machining loads, or the like is exposed to the corrosive environment.

Problem Resolution Means

After we, the inventors, have made diligent studies to attain the above-mentioned purpose, we have found that when a mixture containing a cationic urethane resin and a specific silicon compound in an aqueous medium is prepared so as to show a particular physical property ratio of the mixture to the cationic urethane resin alone, as the composition for adhesion layer which is used for forming an adhesion layer of multi-layered surface-treatment steel sheet having a certain design, it is possible to obtain an adhesion layer which provides an extremely excellent adhesiveness which is influenced by neither the kind of the steel sheet nor the kind of the paint, as well as by neither the variable usage environment nor the variable metal working mode, and wherein the adhesiveness is not mined even if the coating film which has received any scratches or flaws, any machining loads, or the like is exposed to the corrosive environment, can be obtained. To conclude, we, the inventor, have reached the present invention.

Namely, the composition for adhesion layer according to the present invention is the one that is used for obtaining a multi-layered surface treatment steel sheet in which an adhesion layer (S) is formed onto at least one surface of the steel sheet, and a upper layer and/or an intermediate layer (T) which has a design and which contains a rust preventive pigment and/or a colored pigment is formed onto the adhesion layer, and is characterized in that the composition (X) for adhesion layer includes a cationic urethane resin (A) and a silicon compound (B) represented by the following general formula (I) in an aqueous medium, and the ratio (Tc/Ta) between the temperature (Tc) at which the logarithmic decrement for the mixture (C) of the cationic urethane resin (A) and the silicon compound (B) in the rigid-body pendulum type free damped vibration method shows the maximum value and the temperature (Ta) at which the logarithmic decrement for the cationic urethane resin (A) alone in the rigid-body pendulum type free damped vibration method shows the maximum value is in the range of 1.2 to 3.0.

[Chemical Formula 1]

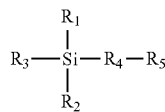
(I)

In the formula (I), $R_1$ to $R_3$ represent mutually independently an alkyl group having a carbon number of 1 to 4 or an alkoxy group having a carbon number of 1 to 4, wherein at least two of $R_1$ to $R_3$ are the alkoxy groups; $R_4$ represents an alkyl group having a carbon number of 2 to 6; and $R_5$ represents 3-amino group or N-2(amino ethyl)3-amino group.

In the composition for adhesion layer according to the present invention, solid content mass ratio [A/B] between the cationic urethane resin (A) and the silicon compound (B) represented by the general formula (I) may be in the range of 1.0 to 4.0.

In the composition for adhesion layer according to the present invention, the cationic urethane resin (A) contains tertiary amine and/or quaternary ammonium; and the concentration of urethane groups may be in the range of 1.0 to 5.0 mmol/g, and the concentration of hydrophilic groups which consist of the tertiary amine and/or the quaternary ammonium may be in the range of 0.1 to 3.0 mmol/g.

In the composition for adhesion layer according to the present invention, above-mentioned Ta of the cationic urethane resin (A) may be in the range of 40° C. to 140° C.

In the composition for adhesion layer according to the present invention, the silicon compound (B) may be at least one selected from the group consisting of 3-amino propyl trimethoxy silane, 3-amino propyl triethoxy silane and 3-amino propyl monomethyl diethoxy silane.

In the composition for adhesion layer according to the present invention, the composition (X) for adhesion layer may contain only the aqueous medium, the urethane resin (A), and the silicon compound (B).

In the composition for adhesion layer according to the present invention, the cationic urethane resin (A) may have alicyclic structure in its skeleton.

Efficacy of the Invention

According to the composition for adhesion layer of the present invention, it is possible to obtain an adhesion layer which provides an extremely strong adhesiveness which is influenced by neither the kind of the steel sheet about the multi-layered surface-treatment steel sheet with a certain design nor the kind of the paint, as well as by neither the variable usage environment nor the variable metal working mode, and wherein the adhesiveness is not ruined even if the coating film which has received any scratches or flaws, any machining loads, or the like is exposed to the corrosive environment. Further, the composition for adhesion layer of the present invention has a remarkably great industrial value, because it can achieve the resources saving and the cost-cutting while reducing the negative environment impacts. Incidentally, since the composition for adhesion layer of the present invention is a non-chromium treating agent, the adhesion layer formed thereby as well as the upper layer and/or intermediate layer formed on the adhesion layer are also allowed to be chromium free.

EMBODIMENT OF THE INVENTION

Figure 1:
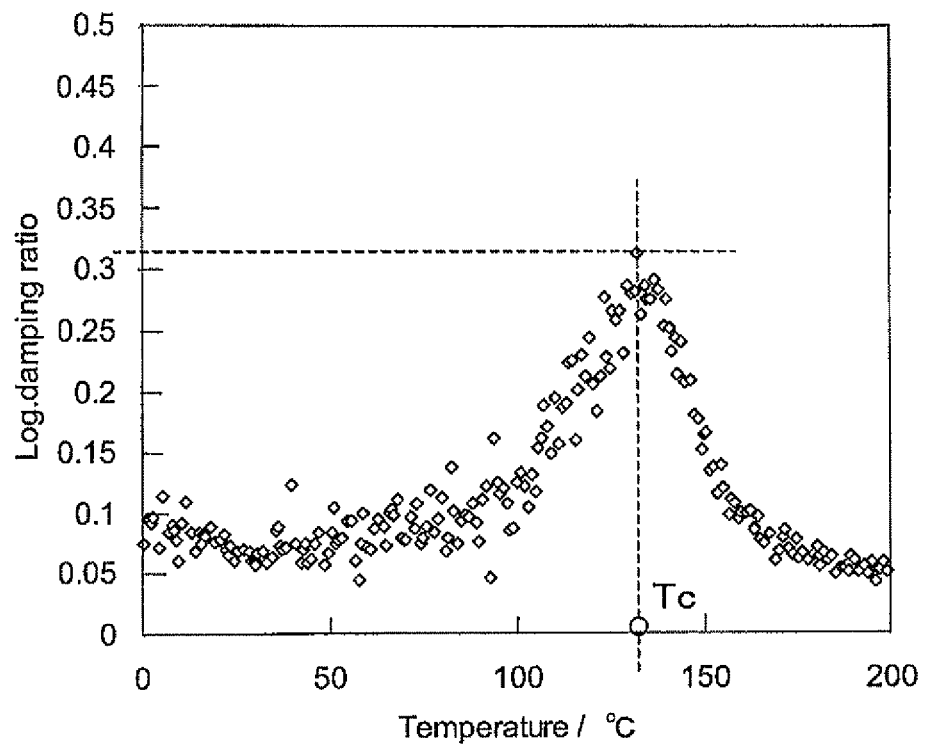
FIG. 1 is a graph where the logarithmic decrements for the mixture in the rigid-body pendulum type free damped vibration method are plotted.

Now, the composition for adhesion layer according to the present invention will be described below in detail.
[Multi-Layered Surface-Treatment Steel Sheet]

First, the multi-layered surface-treatment steel sheet to which the composition for adhesion layer according to the present invention is applied will be described. The multi-layered surface-treatment steel sheet is the one where a coating layer (Z) having a multi-layered structure which comprises an upper layer and/or an intermediate layer (T), and an adhesion layer (S), is formed on at least one surface of steel sheet (hereinafter, it is also designated as "steel sheet surface"). The composition for adhesion layer according to the present invention is an aqueous composition which is used for forming the adhesion layer (S) which constitutes a part of the coating layer (Z). Herein, the words of "at least one surface" means a single side or double sides of the steel sheet.

The multi-layered surface-treatment steel sheet is a surface-treatment steel sheet which belongs to the coated steel sheet that is generally called "PCM (Pre-Coated-Metal) steel sheet", and which is provided with the coating layer (Z) having a multi-layered structure. Herein, the "coating layer (Z) having a multi-layered structure" means a coating layer of three layered structure wherein an adhesion layer, an intermediate layer, and an upper layer are layered in this order on the steel sheet surface, or a coating layer of two layered structure wherein an adhesion layer and an upper layer are layered in this order on the steel sheet surface. The coating layer of three layered structure wherein the intermediate layer is provided may be obtained by forming the adhesion layer so as to cover the steel sheet surface, then forming the intermediate layer so as to cover the adhesion layer, and finally forming the upper layer so as to cover the intermediate layer. On the other hand, the coating layer of two layered structure wherein the intermediate layer is omitted may be obtained by forming the adhesion layer so as to cover the steel sheet surface, and then forming the upper layer so as to cover the adhesion layer.

The upper layer and/or the intermediate layer (T) is the layer which has a design. The design may be applied to either the upper layer or the intermediate layer. In the case of the coating layer (Z) wherein the intermediate layer is omitted, the upper layer has a design inevitably. Incidentally, the design would be given, for instance, as a lustrous beautiful appearance, a mat finish with a low-gloss, or the like, in accordance with the purpose.

With respect to the upper layer and/or the intermediate layer (T) having a design contain, at least one of the upper layer and the intermediate layer contains rust preventive pigment and/or a colored pigment. The rust preventive pigment and/or a colored pigment may be included in the upper layer or the intermediate layer or both layers. Although the intermediate layer lies between the upper layer and the adhesion layer (S), the case that the intermediate layer contain the rust preventive pigment and/or a colored pigment is also involved as an embodiment with respect to this multi-layered surface-treatment steel sheet. Further, in such a case, an embodiment where the upper layer is clear coating also belongs to the scope or range of the present invention. In the case that the design is applied to the upper layer, the intermediate layer is provided for the sake of giving the corrosion resistance. The thickness of the intermediate layer for giving the corrosion resistance is preferable to be 2 μm or more. When the thickness falls below 2 μm, enough rust prevention might not be obtained.

As the rust preventive pigment, for instance, silica type pigments, phosphite type pigments, calcium compounds, aluminum oxides, zirconic acid and/or zirconic acid compounds, vanadic acid and/or vanadic acid compounds, molybdic acid compounds, phosphoric acid and/or phosphoric acid compounds, etc., all of which are added in order to give the rust prevention ability, are enumerated, although the rust preventive pigment is not particularly limited to the above exemplified ones. In the case that the upper layer and/or the intermediate layer (T) does not contain such a rust preventive pigment, the swelling of coating or corrosion from the cut edge part might occur when the pre-coated metallic material undergoes a certain working and thereafter it is used in outdoor.

As the colored pigment, for instance, titanium oxide, red oxide rouge, mica, carbon black, burned black, titan yellow, yellow oxide, phthalocyanine blue, phthalocyanine green, etc., are enumerated, although the colored pigment is not particularly limited to the above exemplified ones. Moreover, additives, such as a brightening regulating agent such as synthetic silica; additive for improving the coating workability such as antifoaming agent or surface regulating agent; anti-scratching agent for the coating, etc., may be also added.

The steel sheet which is used for the multi-layered surface-treatment steel sheet is a material to be treated with the composition (X) for adhesion layer according to the present invention. As such a steel sheet, carbon steel sheets, alloy steel sheets, and plated steel sheets are enumerated. For instance, cold rolled steel sheet, hot rolled steel sheet, stainless steel sheet, hot dip galvanized steel sheet, aluminum containing zinc plated steel sheet, electrogalvanized steel sheet, alloyed zinc plated steel sheet, zinc-nickel plated steel sheet, zinc-cobalt plated steel sheet, zinc vapor deposited steel sheet, nickel plated steel sheet, tinned steel sheet, etc., may be exemplified. As particularly preferable steel sheet, zinc type plated steel sheets, such as hot dip galvanized steel sheet, aluminum containing zinc plated steel sheet, electrogalvanized steel sheet, alloyed zinc plated steel sheet, zinc nickel plated steel sheet, zinc-cobalt plated steel sheet, zinc vapor deposited steel sheet, or the like can be enumerated. Incidentally, the composition (X) for adhesion layer according to the present invention can be also applied to the generally well-known metallic sheets other than the steel sheet, such as aluminum sheets, copper sheets, titanium sheets, magnesium sheets, etc.

[Composition for Adhesion Layer]

The composition for adhesion layer according to the present invention is an aqueous composition which is used for obtaining a multi-layered surface treatment steel sheet in which an adhesion layer (S) is formed onto the steel sheet surface, and an upper layer and/or an intermediate layer (T) which has a design and which contains a rust preventive pigment and/or a colored pigment is formed onto the adhesion layer. This composition (X) for adhesion layer is a composition which includes a cationic urethane resin (A) and a silicon compound (B) represented by the following general formula (I), in an aqueous medium.

(Cationic Urethane Resin)

The cationic urethane resin (A) is necessitated as a film-forming component, and the resin has to contain urethane group in order to satisfy the requirements such as the affinity to the steel sheet surface, the affinity to the intermediate layer or upper layer, the flexibility or rigidity of the adhesion layer, the barrier properties, etc., in balance. Furthermore, the cationic urethane resin (A) has to be cationic from the viewpoints of the miscible stability with the silicon compound (B) and the contamination resistance against the ingredients eluted from the steel sheet surface. Herein, the "contamination resistance" indicates the composition stability (anti-thickening, anti-gelation) on the condition that the metallic ions eluted from the steel sheet surface mingle with the composition (treating agent). In the present invention, since the urethane resin is cationic and thus it shows no reactivity with the contaminated metallic ions (cations), the contamination resistance (a property that the composition stability can be maintained even when the contamination is happened) can be highly expressed.

The cationic urethane resin (A) can be prepared in accordance with any well-known method. For instance, it may be obtained by polymerizing polyol, polyisocyanate, and a compound which has two or more of hydroxyl groups or amino groups and one or more of tertiary amine and/or quaternary ammonium, all of which ingredients have been used usually in the preparation of polyurethane resin, in accordance with the well-known method, then adding to thus obtained urethane polymer an acidic compound such as formic acid or acetic acid, and dispersing the resultant mixture into water, although the preparing method is not particularly limited to the above-mentioned embodiment. The prepared cationic urethane resin (A) can be used singly or in combination of two or more.

As the above-mentioned polyol, for instance, polyester polyols, polyether polyols, polycarbonate polyols, etc., may be enumerated and they can be used singly or in combination of any two or more of members.

As the polyester polyols, for instance, the one which is obtained by direct esterification reaction and/or transesterification reaction of a low molecular polyol with a polycarboxylic acid, ester thereof, anhydride thereof or esterifible derivative thereof such as halide; the one which is obtained by polycondensation of lactone or hydroxy carboxylic acid compound obtained by ring-opening hydrolysis of the lactone; etc., are enumerated.

As the low molecular polyol which is used for the preparation of the polyester polyol, for instance, aliphatic dials such as ethylene glycol, diethylene glycol, diethylene glycol, 1,2-propylene glycol, 1,3-propylene glycol, neopentyl glycol, 1,2-butylene glycol, 1,3-butylene glycol, 1,4-butylene glycol, hexamethylene glycol, bisphenol A, hydrogenated bisphenol A, trimethylol propane, 1,2-propane did, 1,3-propane diol, 2-methyl-1,3-propane diol, 2-butyl-2-ethyl-1,3-propane diol, 1,4-butane diol, neopentyl glycol, 3-methyl-2,4-pentane diol, 2,4-pentane diol, 1,5-pentane diol, 3-methyl-1,5-pentane diol, 2-methyl-2,4-pentane diol, 2,4-diethyl-1,5-pentane diol, 1,6-hexane diol, 1,7-heptane diol, 3,5-heptane diol, 1,8-octane diol, 2-methyl-1,8-octane diol, 1,9-nonane diol, 1,10-decane diol; tri-valent or more valent aliphatic or alicyclic alcohols such as trimethylol ethane, trimethylol propane, hexitols, pentitols, glycerin, diglycerin, polyglycerin, pentaerythritol, dipentaerythritol, tetramethylol propane; etc, are enumerated.

As the polycarboxylic acid which is used for the preparation of the polyester polyol, for instance, aliphatic dicarboxylic acids such as oxalic acid, malonic acid, succinic acid, glutaric acid, adipic acid, pimelic acid, suberic acid, azelaic acid, sebacic acid, dodecanedioic acid, 2-methyl succinic acid, 2-methyl adipic acid, 3-methyl adipic acid, 3-methyl pentanedioic acid, 2-methyl octanedioic acid, 3,8-dimethyl decanedioic acid, 3,7-dimethyl decanedioic acid, dimer acid, hydrogenated dimer acid; alicyclic dicarboxylic acids such as cyclohexane dicarboxylic acid; aromatic dicarboxylic acids such as phthalic acid, isophthalic acid, terephthalic acid, naphthalene dicarboxylic acid; tricarboxylic acids such as trimellitic acid, trimesic acid, a trimer of castor oil aliphatic acids; and polycarboxylic acids involving tetracarboxylic acids and more valent ones such as pyromellitic acid; are enumerated. As the esterifible derivative of the polycarboxylic acid, for instance, anhydrides of these polycarboxylic acids, halides (chloride, bromide, etc.) of these polycarboxylic acids, esters of these polycarboxylic acids with aliphatic lower alcohols (methyl esters, ethyl esters, propyl esters, isopropyl esters, butyl esters, isobutyl esters, amyl esters, and so on), etc., are enumerated.

As the lactone which is used for the preparation of the polyester polyol, for instance, γ-caprolactone, δ-caprolactone, ε-caprolactone, γ-valerolactone, δ-valerolactone, etc., are enumerated.

As the above-mentioned polyether polyols, for instance, ethylene oxide adducts of ethylene glycol, diethylene glycol, triethylene grycol, etc.; propylene oxide adducts of propylene glycol, dipropylene grycol, tripropylene grycol, etc.; ethylene oxide and/or propylene oxide adducts of the above-mentioned polyols; polytetramethylene grycol; etc., are enumerated.

As the above-mentioned polycarbonate polyols, for instance, products which is obtained by reacting a glycol which is selected from 1,4-butane diol, 1,6-hexane diol, diethylene glycol, cyclohexane dimethanol, etc., with diphenyl carbonate or phosgene or the like, are enumerated.

As the above-mentioned polyisocyanate, for instance, tetramethylene diisocyanate, hexamethylene diisocyanate, lysine diisocyanate ester, hydrogenated xylylene diisocyanate, 1,4-cyclohexylylene diisocyanate, 4,4'-dicyclohexyl methane diisocyanate, 2,4'-dicyclohexyl methane diisocyanate, isophorone diisocyanate, 3,3'-dimethoxy-4,4'-biphenylene diisocyanate, 1,5-naphthalene diisocyanate, 1,5-tetrahydronaphthalene diisocyanate, 2,4-tolylene diisocyanate, 2,6-tolylene diisocyanate, 4,4'-diphenyl methane diisocyanate, 2,4'-diphenyl methane diisocyanate, phenylene diisocyanate, xylylene diisocyanate, tetramethyl xylylene diisocyanate, etc., are enumerated. Among them, tetramethylene diisocyanate, hexamethylene diisocyanate, lysine diisocyanate ester, hydrogenated xylylene diisocyanate, 1,4-cyclohexylylene diisocyanate, 4,4'-dicyclohexyl methane diisocyanate, 2,4'-dicyclohexyl methane diisocyanate, isophorone diisocyanate, etc., are enumerated as more preferable poyisocyanates.

As the above-mentioned compound which has two or more of hydroxyl groups or amino groups and one or more of tertiary amine and/or quaternary ammonium, for instance, N,N-dimethyl ethanol amine, N-methyl diethanol amine, N,N-dimethyl ethylene diamine, etc., are enumerated. Further, it is also possible to use N,N,N-trimethylol amine or N,N,N-triethanol amine, each of which has tertiary amine. Among them, polyhydroxy compound which has tertiary amine group and two or more of active hydrogen atoms which are reactive with isocyanate groups is preferable.

As for such a cationic urethane resin (A), it is desirable that the concentration of urethane groups is in the range of 1.0 to 5.0 mmol/g, more preferably, in the range of 1.5 to 4.5 mmol/g, and most preferably, in the range of 2.0 to 4.0 mmol/g. When the concentration of urethane groups is in the range of 1.0 to 5.0 mmol/g, it is expected that the adhesiveness giving effect contributed by hydrogen bond which is included with the urethane bond, as well as an enough film-forming ability and a proper hardness are obtained. Thus, it comes to obtain an extremely excellent bend adhesion.

The concentration of urethane groups can be calculated from the following equation. Herein, $W_{a1}$ denotes the mass of polyol (a1), $W_{a2}$ denotes the mass of isocyanate (a2), $W_{a3}$ denotes the mass of hydrophilic groups (a3) which consist of the tertiary amine and/or quaternary ammonium, $M_{a2}$ denotes the molecular weight of isocyanate (a2), and n denotes the number of isocyanato groups included in one molecule of the isocyanate (a2).

$$\text{Concentration of urethane groups (mmol/g)} = [W_{a2}/(W_{a1}+W_{a2}W_{a3})]/M_{a2} \times n \times 10^3$$

Further, as for such a cationic urethane resin (A), it is desirable that the concentration of hydrophilic groups which consist of the tertiary amine and/or the quaternary ammonium is in the range of 0.1 to 3.0 mmol/g, more preferably, in the range of 0.2 to 2.0 mmol/g, and most preferably, in the range of 0.3 to 2.0 mmol/g. When the concentration of hydrophilic groups is in the range of 0.1 to 3.0 mmol/g, it is expected that the storage stability of the composition (X) for adhesion layer is maintained while the adhesion layer comes to exhibit waterproof.

The concentration of hydrophilic groups is calculated from the preparing amount of the raw material ingredient when synthesizing the cationic urethane resin (A), and is indicated as the amount of the tertiary amine and/or the quaternary ammonium group in the resin solid content. The calculating equation is as follows. In the equation, $W_{a1}$ denotes the mass of polyol (a1), $W_{a2}$ denotes the mass of isocyanate (a2), $W_{a3}$ denotes the mass of hydrophilic groups (a3) which consist of the tertiary amine and/or quaternary ammonium, $M_{a3}$ denotes the molecular weight of hydrophilic group (a3), and n denotes the number of tertiary amine and/or quaternary ammonium which are the hydrophilic groups (a3) in one molecular.

$$\text{Concentration of hydrophilic groups (mmol/g)} = [W_{a3}/(W_{a1}+W_{a2}+W_{a3})]/M_{a3} \times n \times 10^3$$

Further, it is desirable that the cationic urethane resin (A) has alicyclic structure in its skeleton. Although the alicyclic structure may be either the one which is originated from polyol, or the one which is originated from isocyanate, the former one which is originated from polyol is desirable. As the polyol which has alicyclic structure in its skeleton, 1,4-cyclohexyl glycol is exemplified.

(Silicon Compound)

The silicon compound (B) is represented by the following general formula (I), and it may be called "amino silane coupling agent" if using the trivial name. This silicon compound (B) is added in the composition for adhesion layer for the sake of satisfying functions and effects regarding both of the reactivity with the steel sheet surface and the hydrogen bonding capability of the organic terminal groups with the cationic urethane resin (A).

The above-mentioned functions and effects of the silicon compound (B) can be attained by neither an epoxy silane coupling agent which has glycidyl group(s) at its terminal(s), nor an vinyl silane coupling agent which has vinyl group(s) at its terminal(s). Only by the amino silane coupling agent represented by the following general formula (I), the functions and effects can be attained. Incidentally, the silicon compound (B) usually exists as hydrolysate of the silicon compound in the composition for adhesion layer according to the present invention. However, since the composition for adhesion layer is prepared by blending the cationic urethane resin (A) and the silicon compound (B) in a prescribed ratio, the hydrolysate of the silicon compound in the composition for adhesion layer is also designated herein as the "silicon compound (B)".

[Chemical Formula 2]

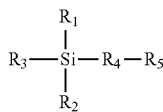
(I)

In the formula (I), $R_1$ to $R_3$ represent mutually independently an alkyl group having a carbon number of 1 to 4 or an alkoxy group having a carbon number of 1 to 4, wherein at least two of $R_1$ to $R_3$ are the alkoxy groups; $R_4$ represents an alkyl group having a carbon number of 2 to 6; and $R_5$ represents 3-amino group or N-2(amino ethyl)3-amino group.

As the silicon compound (B) having the structure of the general formula (I), at least one selected from the group consisting of 3-amino propyl trimethoxy silane, 3-amino propyl triethoxy silane, 3-amino propyl monomethyl diethoxy silane, N-2(amino ethyl)-3-amino propyl trimethoxy silane, and N-2(amino ethyl)-3-amino propyl monomethyl diethoxy silane is desirable. Particularly, at least one selected from the group consisting of 3-amino propyl trimethoxy silane, 3-amino propyl triethoxy silane, and 3-amino propyl monomethyl diethoxy silane is desirable.

(Mixture)

The mixture (C) comprises the cationic urethane resin (A) and the silicon compound (B) in their mixing state. The present invention is characterized in that the ratio (Tc/Ta) between the temperature (Tc) at which the logarithmic decrement for the mixture (C) in the rigid-body pendulum type free damped vibration method shows the maximum value and the temperature (Ta) at which the logarithmic decrement for the cationic urethane resin (A) alone in the rigid-body pendulum type free damped vibration method shows the maximum value is in the range of 1.2 to 3.0.

The logarithmic decrement in the rigid-body pendulum type free damped vibration method can be determined, for instance, by using a rigid-body pendulum type physical properties testing instrument (RPT-3000) manufactured by A&D Company, Ltd. This rigid-body pendulum type physical properties testing instrument is the testing instrument for determining variations of physical properties of a material during the process that the material is cured to film by heat, by setting the knife-edge of the rigid-body pendulum so as to come to contact with coated liquid, and then applying vibration of a prescribed cycle to the pendulum. Concrete determining procedure was as follows: the composition (X) for adhesion layer to be determined was coated onto overall surface in the width direction of a hot dip galvanized steel sheet of 5 cm in length, 2 cm in width, and 0.6 mm in thickness so as to obtain a final dried thickness of 100 to 200 nm; the coated steel sheet (hereinafter, it denotes as "coat steel sheet") was set to the testing instrument instantly, and then the measuring was started; the temperature of testing instrument was adjusted at 40° C. in advance of the measuring, and after the setting of the coat steel sheet and the rigid-body pendulum, the testing instrument was cooled down to −50° C. at a rate of 5° C./min, then it was heated up to 200° C. at a rate of 5° C./min; during such a time course, the cycle of the rigid-body pendulum was measured at every 2 second intervals continuously, and the logarithmic decrement is continuously calculated from measured results. Herein, as the rigid-body pendulum, the one of knife-edge (manufactured by A&D Company, Ltd., RBE-160) was used, and as the weight of the rigid-body pendulum and the moment of inertia, 15 g and 640 gem (manufactured by A&D Company, Ltd., FEE-100) were used, respectively.

Incidentally, in Examples and Comparative Examples mentioned later, the evaluation was performed through the same procedure as above.

Figure 2:
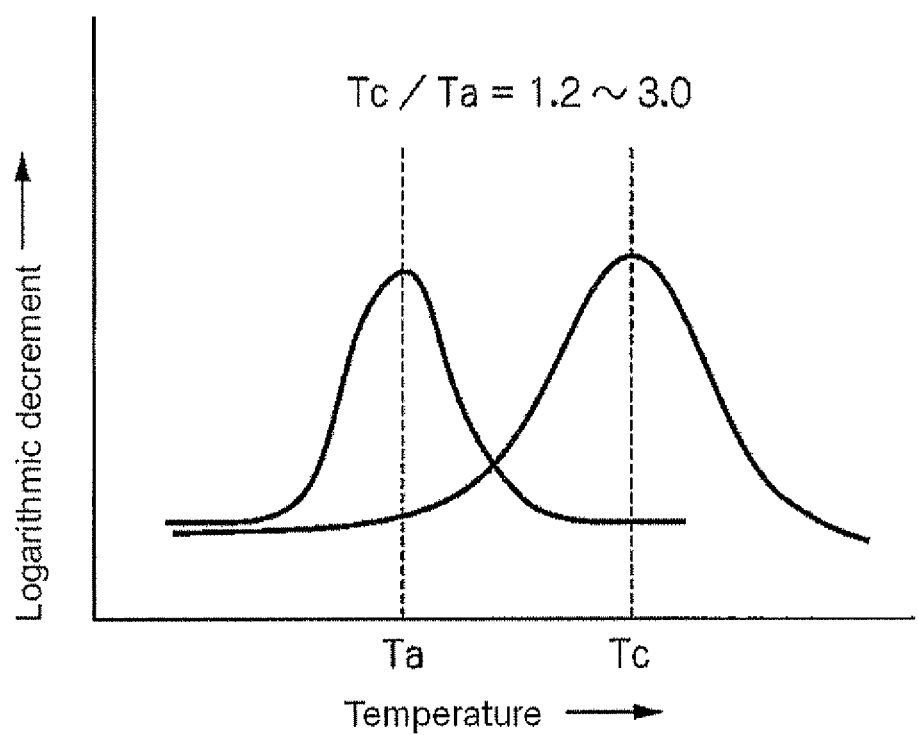
FIG. 2 is a schematic diagram of a logarithmic decrements' curve for the mixture and a logarithmic decrements' curve for the cationic urethane resin alone.

FIG. 1 is a graph where the logarithmic decrements for the mixture in the rigid-body pendulum type free damped vibration method are plotted. In FIG. 1, the temperature indicated the maximum value is Tc. Further, in a similar fashion to FIG. 1, the logarithmic decrements for the cationic urethane resin (A) alone in the rigid-body pendulum type free damped vibration method are plotted, and the temperature indicated the maximum value is designated as Ta. FIG. 2 is a schematic diagram of a logarithmic decrements' curve for the mixture and a logarithmic decrements' curve for the cationic urethane resin alone.

In the present invention, when Tc/Ta is lies in the range of 1.2 to 3.0, it becomes possible to form an adhesion layer which provides an extremely strong adhesiveness to an coating film for the steel sheet surface, which is influenced by neither the kind of the steel sheet about the multi-layered surface-treatment steel sheet nor the kind of the paint about the upper layer and/or the intermediate layer formed on the adhesion layer, as well as by neither the variable usage environment nor the variable metal working mode, and wherein the adhesiveness is not ruined even if the coating film which has received any scratches or flaws, any working loads, or the like is exposed to the corrosive environment. In the case that Tc/Ta is less than 1.2 and in the case that Tc/Ta exceeds 3.0, the bend adhesion (particularly, adhesion in cold working) or the adhesion after corrosion resistant test (particularly, adhesion after corrosion resistance test of the bent portion) becomes insufficient, and thus neither of these two cases is preferable. Tc/Ta is more desirable to be in the range of 1.5 to 2.5, and most desirable to be in the range of 1.8 to 2.2, from the viewpoint of obtaining more excellent characteristics.

It is desirable that Ta of the cationic urethane resin (A) is in the range of 40° C. to 140° C., and it is more desirable to be in the range of 50° C. to 130° C., and it is most desirable to be in the range of 55° C. to 120° C. When Ta of the cationic urethane resin (A) is in the range of 40° C. to 140° C., the flexibility of the concerned urethane resin which exerts an influence upon the bend adhesion, and the scratch adhesion can be compatible. On the other hands, Tc of the mixture (Z) is 1.2 times to 3.0 times larger than Ta. Preferably, Tc is 1.2 times to 3.0 times larger than Ta, more preferably, 1.5 times to 2.5 times larger than Ta, and most preferably, 1.8 times to 2.2 times larger than Ta, at the temperature range of 50° C. to 200° C., individually.

As for the mixing ratio between the cationic urethane resin (A) and the silicon compound (B), it is preferable to blend the cationic urethane resin (A) and the silicon compound (B) so that the solid content mass ratio [A/B] between the cationic urethane resin (A) and the silicon compound (B) satisfies a condition of being in the range of 1.0 to 4.0, more preferably, in the range of 1.2 to 3.0, and most preferably, in the range of 1.3 to 2.0. When the solid content mass ratio [A/B] lies in the range of 1.0 to 4.0, it becomes possible to obtain the toughness of the adhesion layer, which is followed by an acquisition of the bend adhesion as well as an enhancement in the adhesion to the steel sheet surface. Further, since the adhesion layer becomes harder, the scratch resistance can be secured.

To the composition (X) for adhesion layer, it is possible to add as arbitrary elements, any organic solvent for the sake of improving the film-forming ability and the drying behavior of the adhesion layer, any surfactant for the sake of improving wettability, any thickener for the sake of regulating the film thickness, any defaming agent for repressing foaming, any electroconductive material for the sake of improving weldability, etc., unless the liquid stability of the composition for adhesion layer and the effects of the present invention are ruined. As the organic solvent, for instance, alcohol type, ketone type, ester type, ether type, etc., may be enumerated, but not particularly limited thereto. As the surfactant, for instance, nonionic surfactants such as alkyl allyl ether type, alkyl ether type, alkyl ester type, alkyl amine type, etc.; anionic surfactants such as fatty acid salts, alkylsulfate salts, sulfates of aliphatic amines, sulfonates of dibasic fatty acid esters, etc; may be enumerated, but not particularly limited thereto.

As for pH of the composition (X) for adhesion layer, it is suitable to be in the range of pH 5 to 11, although there is no particular limitation as long as the effect of this invention can be achieved. As for the concentration of the solid content in the composition (X) for adhesion layer, it is desirable to be in the range of 1 to 20% by mass, although there is no particular limitation as long as the effect of this invention can be achieved. When the concentration of the solid content is less than 1% by mass, it becomes difficult to attain a film thickness to be aimed. On the other hand, when the concentration of the solid content exceeds 20% by mass, it falls into a tendency that the stability of the composition for adhesion layer is hardly maintained.

The composition (X) for adhesion layer can be prepared by adding the cationic urethane resin (A) and the silicon compound (B), as well as any arbitrary element(s) which is (are) optionally used as demands, to water as the dispersion medium, and stirring them. Upon this preparation, there is no particular limitation about the adding order of these ingredients. As mentioned above, although the above mentioned arbitrary elements may be added unless the liquid stability of the composition for adhesion layer and the effects of the present invention are ruined, it is particularly desirable for the present invention that the composition (X) for adhesion layer contains only the aqueous medium, the urethane resin (A), and the silicon compound (B).

(Formation of Adhesion Layer)

In advance of the formation of the adhesion layer with using the composition (X) for adhesion layer, (1) it is possible to perform cleaning with a degreasing agent, cleaning with hot water, acid cleaning, alkaline cleaning, solvent cleaning, or the like in an appropriate combination thereof, in order to remove oil or dust which are being adhered to the steel sheet, and/or (2) it is possible to perform the surface treatment of the steel sheet in order to improve further the corrosion resistance of the steel sheet as well as the adhesion between the adhesion layer and the steel sheet, although these steps are not essential. As the above mentioned surface treatment, for instance, the chemical conversion treatment by which metal(s) selected from Fe, Co, Ni, Cu, Zn, Mn, Zr, Ti, V, or the like is put on the steel sheet surface, or the phosphate chemical conversion treatment may be enumerated, although the surface treatment is not particularly limited thereto. As for the cleaning of the steel sheet surface, it is preferable that the cleaning is thereafter followed by the rinsing with water so as not to remain the used cleaning agent on the steel sheet surface.

The adhesion layer can be formed by drying the applied composition (X) for adhesion layer after the composition (X) for adhesion layer is coated on the steel sheet. As for the method for coating the composition (X) for adhesion layer onto the steel sheet, there is no particular limitation, and for instance, roller coating method, dipping method, spraying method, bar coating method, or the like, are enumerated. Further, with respect to the temperature of the composition upon the coating, although there is no particular limitation, it is preferable to be in the range of 10° C. to 60° C., more preferably, in the range of 15° C. to 40° C. Furthermore, with respect to the drying method, there is also no particular limitation, and, for instance, air-drying; drying with air blowing; heat drying which utilizes hot-air oven, induction heating oven, electric oven, or the like, may be enumerated. Particularly, the heat drying which utilizes hot-air oven, induction heating oven, electric oven, or the like is desirable. With respect to the ultimate temperature of the steel sheet upon the drying, although there is also no particular limitation, it is preferable to be in the range of 50° C. to 250° C., more preferably, in the range of 70° C. to 220° C.

As for the mass of the dried adhesion layer, 20 to 200 mg/m$^2$ (rough estimate thickness: about 20 nm to 200 nm) is desirable, 50 to 150 mg/m$^2$ (rough estimate thickness: about 50 nm to 150 nm) is more desirable, and 75 to 150 mg/m$^2$ (rough estimate thickness: about 75 nm to 150 nm) is most desirable. When the mass of the adhesion layer is less than 20 mg/m$^2$, the intended effect contributed by the adhesion layer may not be attained because the adhesion layer having an enough thickness cannot be formed. On the other hand, when the mass of the adhesion layer exceeds 200 mg/m$^2$, a tendency of degrading the bend adhesion may arise because the adhesion layer formed becomes easier to cause the cohesive failure.

(Effect Factor of Adhesion Layer)

Now, a description about the appearance of the effect of the adhesion layer will be made below. Herein, an assumption about the reason why the adhesion layer which provides an extremely strong adhesiveness which is influenced by neither the kind of the steel sheet about the multi-layered surface-treatment steel sheet with a certain design nor the kind of the paint, as well as by neither the variable usage environment nor the variable metal working mode is obtained by using the above-mentioned composition (X) for adhesion layer will be attempted below. Nevertheless, it should be understood that the scope and range of the invention as well as the effect of the invention are not interpreted restrictively by such an assumption.

As previously described, although the composition (X) for adhesion layer according to the present invention contains the cationic urethane resin (A) and the silicon compound (B), it is particularly preferable that the composition (X) contains only the urethane resin (A) and the silicon compound (B). Herein, the reason why the necessitated is the cationic urethane resin (A) is that, as mentioned above, it is the best for the film-forming component which fulfills the requirements such as the affinity to the steel sheet surface, the affinity to the intermediate layer or upper layer, the flexibility or rigidity as a film, the bather properties, etc., in balance. When using an acrylic resin, epoxy resin or the like, in stead of the cationic urethane resin, it is impossible to obtain sufficient properties.

Moreover, there are the aforementioned desirable ranges with respect to the concentration of the urethane groups and the concentration of hydrophilic groups individually, as the conditions for being the cationic urethane resin (A) to perform sufficient properties. When the molecular weight of the cationic urethane resin (A) is roughly decided (e.g. about 500,000 to 1,500,000), the concentration of the urethane groups is depended on the molecular weight of polyol which is the soft segment adjacent to the urethane bond. The giving effect of the urethane bond in the cationic urethane resin (A) is very strong, and it is involved not only in the physical properties, such as the elongation and the tensile strength, but also in the adhesiveness with the steel sheet surface. Particularly, in the case of the cationic urethane resin (A) having no reactive functional group such as carboxyl group, it is thought that it adheres to the steel sheet surface almost perfectly owing to the hydrogen binding ability owned by the nitrogen atoms and OH groups in the urethane bond, because the resin (A) does not have the self cross-linking ability such as organic cross-linking. Therefore, although there has been a tendency to think that the higher the concentration of the urethane group, the higher adhesiveness is contributed, such a result is not necessarily obtained. This is because, in the case that the molecular weight of the polyol or the structure of the polyol is inapposite even though the concentration of the urethane group is high, the toughness of the film is lost, and as the result, the film is not able to follow the bending. Namely, it is thought that an excellent adhesion would be expected when the structure of the soft segment and the molecular weight are proper, that is, the concentration of the urethane group is proper. Further, as for the concentration of the hydrophilic groups, it contributes mainly to the storage stability, although the hydrophilic groups show the hydrogen bonding ability in some degree. When the concentration of the hydrophilic groups is proper, the stability of the cationic urethane resin (A) in water can be secured.

On the other hand, the silicon compound (B) should have an amino group at a terminal end of its molecular. The alkoxysilyl group(s) or silanol group(s) of the silicon compound (B) reacts strongly with the surface of the steel sheet. This is the conventionally known phenomenon, and the silicon compound bound to the steel sheet surface and other ingredients are usually integrated by the action of the reactive functional group residing at another terminal end of the silicon compound (B). In such a situation, a way of using a resin which is provided with carboxyl groups and a silicon compound having an epoxy group has been generally utilized. However, the film formed by such a mechanism is very hard and quite brittle, thus, it is unusual to acquire an adequate adhesiveness. Therefore, as the silicon compound which can be used in the present invention, the one which possesses a functional group having a highly reactivity with the cationic urethane resin (A), which can exhibits sufficient hardness and sufficient elongation, and which forms the hydrogen bonding with the aforementioned urethane resin, and which provides the elasticity to the formed film, i.e., the amino-group containing silicon compound (B), is selected. Then, the points which becomes important under such a selection are the mixing ratio between the cationic urethane resin (A) and the amino-group containing silicon compound (B); and the skeleton of the cationic urethane resin (A) to which the amino-group containing silicon compound (B) is effectively functioned. The index of these points is the aforementioned [Tc/Ta].

In the adhesion layer (S) formed with the composition (X) for adhesion layer, a metalloxane bond concentrated layer where the steel sheet surface is chemically react with the silanol groups of terminal ends of the silicon compound molecules exists at the region adjacent to the steel sheet surface. Coincidentally, some other silanol groups react with each other so as to form siloxane bonds. For the mason that the reactivity of these silanol groups are very high, in addition, for the structural reason, the molecules of the silicon compound (B) are arranged comparatively regularly so as to be easy to form the siloxane bonds, in which the silanol groups are directed to the region adjacent to the steel sheet surface, and the organic functional groups of the other terminal ends are directed to the inside of the adhesion layer. It is well known in the art that the compound which belongs to the group which is called "silane coupling agents having silanol group(s)" causes a chemical reaction similar to the above explanation. Although it is guessed that the excellent adhesiveness that is the effect of this invention is obtained by mixing the silicon compound (B) which is intended to form such a structure, the effect is greatly varied by the kind of the terminal organic functional group. Here, the point which comes into important is the interaction of the silicon compound with the cationic urethane resin (A) which is the film-forming ingredient.

From the above-mentioned viewpoints, we, the inventors, have found that the most effective thing that acts to give the both properties of toughness and flexibility which are mutually contradictory is the hydrogen bond. Moreover, we have found that the silicone compound (B) for forming effectively the hydrogen bond is the amino-group containing silicone compound. Namely, it is assumed that it becomes possible to form the adhesion layer (S) which is not a mere mixture when the amino groups that are the terminal organic functional groups are brought into the condition of directing to the inside of the adhesion layer by the aforementioned film-forming mechanism, and then the amino groups are allowed to form the hydrogen bonds with the nitrogen atoms which are includes in the urethane bonds of the cationic urethane resins.

It is guessed that the adhesion layer (S) which is formed by the aforementioned mechanism shows a very excellent adhesiveness because of the linkage with the steel sheet surface by means of the metalloxane bonds, and the linkage between the cationic urethane resin (A) and the silicon compound (B) by means of the hydrogen bonds. However, these linkages do not the ones that become better simply as the numbers of linkages increase. They have an optimum range individually. Here, the aforementioned ratio [Tc/Ta] becomes important. This index indicates the degree of physical and chemical interaction of the silicon compound (B) to the adhesion layer (S) formed by the aforementioned mixture (C). Namely, this index indicates how extent of toughness and flexibility are given on the adhesion layer formed by the mixture (C) by the effects of, such as the introduction of physical skeleton due to the organic chain of the silicon compound (B) or the allocation of hydrogen bond parts due to the terminal end amino group of the silicon compound (B), as compared with the resin film formed the cationic urethane resin (A) alone.

It has been known that the temperature at which the logarithmic decrement in the rigid-body pendulum type flee damped vibration method shows the maximum value indicates the strength of the film, the density of physical or chemical network structure of the film, etc. Namely, it is indicated that the Tc of the mixture should be adjusted to a temperature which indicates the maximum logarithmic decrement that becomes 1.2 times to 10 times larger than the Ta of the film of the cationic urethane resin (A) alone. When the Tc/Ta is less than 1.2, it is considered that there is substantially no change in the physical properties, and indeed, a sufficient improvement effect is not given on the actual adhesiveness. Oppositely, the Tc/Ta of exceeding to 3.0 indicates that the adhesion layer becomes extremely rigid, where the degree of freedom for the bonding which is one of the characteristics of the hydrogen bond is lost, and the adhesion layer becomes a layer having no flexibility. Indeed, no adhesiveness is obtained. This index can be varied by the adjustment of skeleton of the cationic urethane resin (A), the adjustment of additive amount of the silicon compound (B) or the like. Therefore, by means of this index, it is possible to adjust the adhesiveness necessitated by the adhesion layer (X) to be used for the usage of the present invention, so as to become the maximum value. Thus, when using this index, the formation of the adhesion layer of an extremely superior adhesiveness which has been never attained up to now can be realized.

The adhesion layer (S) which is formed by the aforementioned mechanism shows an absolute repression effect against the under-film corrosion that is a representative corrosive mode of multi-layered surface treatment steel sheet, because of the linkage with the steel sheet surface by means of the metalloxane bonds, and dense network structure formed by hydrogen bonds between the cationic urethane resin (A) and the silicon compound (B). This effect is given by the inactivation of material surface by the silicon compound (B) and the repression of the diffusion of corrosive factors. Particularly, the initial corrosion and the progress of under-film corrosion are repressed. Further, a part of the siloxane bonds which are formed by the silicon compound (B) is dissociated under the high alkaline circumstance which is created when corroding, and the dissociated chemicals come to form again metalloxane bonds with the activated point on the steel sheet surface which am caused by corrosion, and thereby, further progression of the corrosion is repressed. Thus, it is guessed that the excellent adhesiveness can be maintained because the under-film corrosion reaction is hardly caused even when the steel sheet is exposed to a various corrosive environment.

(Logarithmic Decrement Peak in the Rigid-Body Pendulum Type Free Damped Vibration Method)

Here, the logarithmic decrement peak in the rigid-body pendulum type free damped vibration method will be explained. As shown in FIG. 1 and FIG. 2, with respect to the composition for adhesion layer according to the present invention, the logarithmic decrement peaks for the mixture and the logarithmic decrement peaks for the cationic urethane resin alone in the rigid-body pendulum type free damped vibration method within the range of the measured temperature shows individually only one significant peak. Such a result was confirmed in each of Examples described below on their measurement. The reason for such a result is that the cationic urethane resin which constitutes the present invention does not have a reactive functional group such as carboxyl group, and thus, the cationic urethane resin does not show the self cross-linking ability, and its physical properties depend strongly on the hydrogen bonds which am owned by the nitrogen atom and OH groups in the urethane bond. On the other hand, as for the anionic urethane resin and nonionic urethane resin which have cross-linkable functional group such as carboxyl group, there am some cases where two or more of significant peaks am appeared, as different from the result of present invention. This tendency is significant in the systems which contains a cross-linking agent. For instance, in the case of the system which contains the blocked isocyanate type cross-linking agent, a peak is generated at the temperature when the deblocking occurs, namely, the temperature when the cross-linking reaction occurs. Thus, total two peaks are observed. In the case that there are two or more of the cross-linking points as described above, the peak is generated at each individual cross-linking point, thus, which is clearly different from the result obtained from the present invention.

As described above, the logarithmic decrement peaks obtained by the rigid-body pendulum type free damped vibration method have each individual reason according to the individual structural change. Depending on the selection of the resin and the cross-linking agent, various modes are created. The number of peaks is depended on the combination of the cross-linking agents by which the cross-linking reaction is caused. From such viewpoints as mentioned above, since the change of the logarithmic decrement peak in the rigid-body pendulum type free damped vibration method, which is obtained by the mixture of the cationic urethane resin (A) which has no structural cross-linking ability and the silicon compound (B) in the present invention, indicates a clear change in the film structure in the mixture system (non-cross linking system) which has not been grasped, it becomes possible to form the adhesion layer having an extremely excellent adhesiveness when administrating the degree of the change.

EXAMPLE

Now, the present invention will be described concretely by enumerating some examples and comparative examples. However, it should be noted that the present invention is not limited to the following examples.

1. Composition for Adhesion Layer 1.1 Examples 1 to 70 and Comparative Examples 1 to 12

Cationic polyurethane resins (A) were synthesized individually by using the respective raw materials shown in Tables 1 to 3 and S1: monomethyl diethanol amine as the hydrophilic group containing monomer, with the respective combinations and ratios shown in Tables 4 and 5, and the obtained cationic polyurethane resins (A) were tested. Further, silicon compounds (B) used were shown in Table 7.

1.1.1 Cationic Urethane Resin (A) and Comparative Cationic Urethane Resin

A1 (for Example): A prepolymer was prepared by reacting 150 parts by mass of polyester polyol prepared from tetramethylene glycol and adipic acid; 45.4 parts by mss of hexamethylene diisocyanate; and 20 parts by mass of monomethyl diethanol amine; in 100 parts by mass of N-methyl 2-pyrrolidone. Then, the obtained prepolymer were neutralized with using formic acid, and it was dispersed into deionized water, in order to obtain an aqueous polyurethane resin.

A2 to A8, A10 to A15, A18 to A26, A28 to A32, A34 to A36, A38 to A44, A46 to A52 (for Examples) and A9, A16 to A17, A27, A33, A37, A45 (for Comparative Examples) were prepared in an analogous fashion. Cationic urethane resins (A) of A1 to A52 are shown in Tables 4 and 5, and the physical properties thereof determined by the measuring procedures as described below are shown in Table 6.

(Concentration of Urethane Groups)

The equivalent of the urethane groups was calculated by using the following equation as described in the aforementioned section for the cationic urethane resin (A). Herein, $W_{a1}$ denotes the mass of polyol (a1), $W_{a1}$ denotes the mass of isocyanate (a2), $W_{a3}$ denotes the mass of hydrophilic groups (a3) which consist of the tertiary amine and/or quaternary ammonium, $W_2$ denotes the molecular weight of isocyanate (a2), and n denotes the number of isocyanato groups included in one molecule of the isocyanate (a2).

$$\text{Concentration of urethane groups } (mmol/g) = [W_{a2}/(W_{a1}+W_{a2}W_{a3})]/M_{a2} \times n \times 10^3$$

(Concentration of Hydrophilic Groups)

The concentration of the hydrophilic groups was calculated by using the following equation as described in the aforementioned section for the cationic urethane resin (A). Herein, $W_{a1}$ denotes the mass of polyol (a1), $W_{a1}$ denotes the mass of isocyanate (a2), $W_{a3}$ denotes the mass of hydrophilic groups (a3) which consist of the tertiary amine and/or quaternary ammonium, $M_{a3}$ denotes the molecular weight of hydrophilic group (a3), and n denotes the number of tertiary amine and/or quaternary ammonium which are the hydrophilic groups (a3) in one molecular.

$$\text{Concentration of urethane groups } (mmol/g) = [W_{a2}/(W_{a1}+W_{a2}W_{a3})]/M_{a3} \times n \times 10^3$$

1.1.2 Silicon Compound (B)

Silicon compounds (B) used for the evaluation were shown in Table 7. In Table 7, B1 to B4 are the silicon compounds for Examples, and B5 to B6 are the silicon compound for Comparative Examples.

1.2 Comparative Examples 13 to 20

The following compositions for adhesion layer were prepared by referring to the Patent Literatures 1 to 13.

Comparative Example 13

The following composition for adhesion layer was prepared by referring to Example 5 of the Patent Literature 2, and it was tested.
Composition for adhesion layer: the one in which 100 parts by weight of polyester resin prepared from terephthalic acid having a molecular weight of 15000, ethylene glycol and bisphenol A; 10 parts by weight of bisphenol A type epoxy resin; and 18 parts by weight of blocked isocyanate compound were mixed, and 90 parts by weight of titanium oxide were added thereto as a colored pigment.

Comparative Example 14

The following composition for adhesion layer was prepared by referring to Example 8 of the Patent Literature 3, and it was tested.
Composition for adhesion layer: the one in which 55 parts by weight of urethane resin (manufactured by ADEKA Corporation, HUX-290H); 15 parts by weight of condensed calcium phosphate B described in the Patent Literature 3; 5 parts by weight of sodium vanadate; and 10 parts by weight of phosphoric acid were mixed.

Comparative Example 15

The following composition for adhesion layer was prepared by referring to Example 4 of the Patent Literature 4, and it was tested.
Composition for adhesion layer: the one in which 100 parts by weight of dispersed paste described in the Patent Literature 4; 150 parts by weight of epoxy resin (manufactured by DIC Corporation, EN-0274); and 100 parts by weight of urethane resin (manufactured by Mitsui Takeda Chemicals, Inc., TAKELAC W-6010) were mixed.

Comparative Example 16

The following composition for adhesion layer was prepared by referring to Example 1 of the Patent Literature 5, and it was tested.
Composition for adhesion layer: the one in which 100 parts by weight of the urethane resin A1 described in the Patent Literature 5; 1 part by weight of methyloled phenol; and 1 part by weight of potassium zirconium carbonate were mixed.

Comparative Example 17

The following composition for adhesion layer was prepared by referring to Example 3 of the Patent Literature 7, and it was tested.
Composition for adhesion layer: the one in which 100 parts by weight of the one in which the urethane resin A described in the Patent Literature 7; 15 parts by weight of PE wax A; and 10 parts by weight of colloidal silica were mixed, wherein each part by weight was based on the weight of individual solid content.

Comparative Example 18

The following composition for adhesion layer was prepared by referring to Example 4 of the Patent Literature 10, and it was tested.
Composition for adhesion layer: the one which was obtained by reacting 100 parts by weight of the urethane resin B prepared in Manufacturing Example 2 of the Patent Literature 10 with 3.84 parts by weight of tetramethoxy silage.

Comparative Example 19

The following composition for adhesion layer was prepared by referring to Example 4 of the Patent Literature 11, and it was tested.
Composition for adhesion layer: the one in which 90 parts by weight of the polyurethane resin A described in the Patent Literature 11; 5 parts by weight of triammonium phosphate; and 5 parts by weight of colloidal silica were mixed.

Comparative Example 20

The following composition for adhesion layer was prepared by referring to Example 13 of the Patent Literature 13, and it was tested.
Composition for adhesion layer: the one in which 67 parts by weight of the polyurethane resin A described in the Patent Literature 13; 20 parts by weight of colloidal silica F (manufactured by Nissan Chemical Industries, Ltd., SNOWTEX N); 3 parts by weight of trisodium phosphate and the cross linking agent K (manufactured by Matsumoto Pharmaceutical Manufacture, Co., Ltd., TC-400) were mixed.

2 Paint for Intermediate Layer

As paint for intermediate layer, T1: V-NIT #200 (manufactured by Dai Nippon Toryo Co., Ltd.); and T2: FLEKICOAT 600 (manufactured by Nippon Paint Co., Ltd.) were used.

3 Paint for Upper Layer

As paint for upper layer, U1: V-NIT #500 (manufactured by Dai Nippon Toryo Co., Ltd.); and U2: FLEKICOAT 5030 (manufactured by Nippon Paint Co., Ltd.) were used.

4 Preparation of Test Sheet

4.1 Test Pieces

As the hot dip galvanized steel sheet (G1), a steel sheet which had 0.5 mm in thickness of sheet, and has 100 g/m² in deposit mass per one surface side (both side galvanized) was used.

4.2 Pre-Treatment

The test pieces underwent spraying treatment of CL-N364S (manufactured by Nihon Parkerizing Co., Ltd.) that was an alkaline degreasing agent under the condition that the concentration of the degreasing agent was set to 20 g/L and the temperature was 60° C., for 30 seconds. Then, the treated test pieces were rinsed with tap water, squeezed with draining rolls, and heat dried at 50° C. for 30 seconds.

4.3 Surface Treatment

4.3.1 Forming of Adhesion Layer

Examples 1 to 70, 74 to 76 and Comparative Examples 1 to 20

The compositions for adhesion layers were coated individually on a surface (one side) of the pre-treated test piece by using bar coater so as to obtain a dry film mass of 100 mg/m² individually. Thereafter, each coated test piece was heat dried by a hot-air drying oven under the condition that the ultimate temperature of the sheet upon the drying was 100° C.

Example 71

A composition for adhesion layer which was the same with the composition of Example 11 was coated on a surface (one side) of the pre-treated test piece by using bar coater so as to obtain a dry film mass of 50 mg/m². Thereafter, the coated test piece was heat dried by a hot-air drying oven under the condition that the ultimate temperature of the sheet upon the drying was 100° C.

Example 72

A composition for adhesion layer which was the same with the composition of Example 11 was coated on a surface (one side) of the pre-treated test piece by using bar coater so as to obtain a dry film mass of 200 mg/m². Thereafter, the coated test piece was heat dried by a hot-air drying oven under the condition that the ultimate temperature of the sheet upon the drying was 100° C.

Example 73

A composition for adhesion layer which was the same with the composition of Example 11 was coated on a surface (one side) of the pre-treated test piece by using bar coater so as to obtain a dry film mass of 500 mg/m². Thereafter, the coated test piece was heat dried by a hot-air drying oven under the condition that the ultimate temperature of the sheet upon the drying was 100° C.

4.3.2 Intermediate Layer

Examples 1 to 74 and Comparative Examples 1 to 20

The paint T1 for intermediate layer was coated on a surface (one side) of the adhesion layer coated test piece by using bar coater so as to obtain a dry film thickness of 8 μm. Thereafter, the test piece was heat dried by a hot-air drying oven under the condition that the ultimate temperature of the sheet upon the drying was 200° C.

Example 75

The paint T2 for intermediate layer was coated on a surface (one side) of the adhesion layer coated test piece by using bar coater so as to obtain a dry film thickness of 8 μm. Thereafter, the test piece was heat dried by a hot-air drying oven under the condition that the ultimate temperature of the sheet upon the drying was 200° C.

Example 76

The forming of intermediate layer was omitted.

4.3.3 Upper Layer

Examples 1 to 73, 75 to 76 and Comparative Examples 1 to 20

The paint U1 for upper layer was coated on a surface (one side) of the adhesion layer and intermediate layer coated test piece by using bar coater so as to obtain a dry film thickness of 20 μm. Thereafter, the test piece was heat dried by a hot-air drying oven under the condition that the ultimate temperature of the sheet upon the drying was 220° C.

Example 74

The paint U2 for topcoating layer was coated on a surface (one side) of the adhesion layer and intermediate layer coated test piece by using bar coater so as to obtain a thy film thickness of 20 μm. Thereafter, the test piece was heat dried by a hot blast oven under the condition that the ultimate temperature of the sheet upon the drying was 220° C.

5 Evaluation Tests

5.1 Measurement of Physical Properties (Temperature (Ta) at which the Logarithmic Decrement for the Cationic Urethane Resin (A) Alone in the Rigid-Body Pendulum Type Free Damped Vibration Method Shows the Maximum Value)

With respect the cationic urethane resins (A) which have individual compositions shown in Tables 4 and 5, the temperature (Ta) at which the logarithmic decrement for the cationic urethane resin (A) alone in the rigid-body pendulum type free damped vibration method shows the maximum value was determined by the following procedure.

<Sample>
Dimensions of sample: 5 cm in length, 2 cm in width, 0.6 mm in thickness
Material: hot dip galvanized steel sheet
Thickness of sample: 100 to 200 nm
<Testing Instrument>
Testing instrument Rigid-body pendulum type physical properties testing instrument RPT-3000 (manufactured by A&D Company, Ltd.)
Pre-heating: 40° C.
Cooling: down to −50° C. at a rate of 5° C./min
Heating: up to 200° C. at a rate of 5° C./min
Measuring interval: measuring at every 2 second intervals continuously (the logarithmic decrement is continuously calculated)
Rigid-body pendulum: knife-edge (manufactured by A&D Company, Ltd., RBE-160)
Weight of pendulum, moment of inertia: 15 g, 640 gem (manufactured by A&D Company, Ltd., FBE-100)
(Temperature (Tc) at which the Logarithmic Decrement in the Rigid-Body Pendulum Type Free Damped Vibration Method Shows the Maximum Value)

With respect the mixtures (C) of the cationic urethane resins (A) and the silicone compounds (B) which were mixed according to the combinations and ratios shown in Tables 8 to 14, the temperature (Tc) at which the logarithmic decrement in the rigid-body pendulum type free damped vibration method shows the maximum value were determined by the same procedure as mentioned above.

5.2 Bend Adhesion Test

5.2.1 Primary Adhesion Test

In conformity to the test method of JIS-G 3312, the "OT bend test" where no inside spacing plate was sandwiched was applied to the individual test pieces at 20° C. The exfoliated state of the coating film after the adhesive tape test was observed macroscopically, and evaluated according to the following criteria.
<Criteria>
⊚: No exfoliation was observed.
○: Exfoliated area was less than 10%.
Δ: Exfoliated area was not less than 10% and less than 50%.
x: Exfoliated area was not less than 50%.

5.2.2 Secondary Adhesion Test

The test pieces were immersed into boiling water for 2 hours, and then left to stand for one day. Thereafter, the test pieces underwent the same test (OT bend test) as described in the primary bend adhesion test. The criteria were as follows.
<Criteria>
⊚: No exfoliation was observed.
○: Exfoliated area was less than 10%.
Δ: Exfoliated area was not less than 10% and less than 50%.
x: Exfoliated area was not less than 50%.

5.2.1 Adhesion Test Under Cold Environment

The test pieces which were cooled to −15° C. underwent the same test (OT bend test) as described in the primary adhesion test. The criteria were as follows.
<Criteria>
⊚: No exfoliation was observed.
○: Exfoliated area was less than 10%.
Δ: Exfoliated area was not less than 10% and less than 50%.
x: Exfoliated area was not less than 50%.

5.3 Scratch Test

53.1 Primary Coin-Scratch Test

A 10 yen coin was set to each test piece in the angle of 45°, and the coating film on the test piece was rubbed with the coin under a load of 2 kg and at a constant speed. Thereafter, the extent of damage of the coating film was observed macroscopically, and the coin-scratch resistance was evaluated according to the following criteria.
<Criteria>
⊚: Exfoliated area was less than 10%.
○: Exfoliated area was not less than 10% and less than 20%.
Δ: Exfoliated area was not less than 20% and less than 50%.
x: Exfoliated area was not less than 50%.

53.2 Secondary Coin-Scratch Test

The test pieces were immersed into boiling water for 2 hours, and then left to stand for one day. Thereafter, the test pieces underwent the same test with the primary coin-scratch test. The criteria were as follows.
<Criteria>
⊚: Exfoliated area was less than 10%.
○: Exfoliated area was not less than 10% and less than 20%.
Δ: Exfoliated area was not less than 20% and less than 50%.
x: Exfoliated area was not less than 50%.

5.4 Combined Test of Corrosion Resistance and Adhesion

5.4.1 Adhesion after Corrosion Resistant Test of Cross-Cut Part (Cross Cut+SST)

The test piece on which 1 mm squire cross-cut (100 squares) was formed by using NT cutter in advance was put into the salt spray test instrument in conformity to JIS-22371, for 72 hours. Thereafter, the adhesive tape exfoliation test was performed, and it was followed by the evaluation according to the following criteria.
<Criteria>
⊚: The number of remained squares was 100.
○: The number of remained squares was in the range of 90 to 99.
Δ: The number of remained squares was in the range of 50 to 90.
x: The number of remained squares was less than 50.

5.42 Adhesion after Corrosion Resistant Test of Cross-Cut Part+Processed Part (Cross Cut+Er+SST)

The test piece on which 1 mm square cross-cut (100 squares) was formed by using NT cutter and which the cross-cut part was further protruded by a Erichsen tester at 7 mm in height in advance was put into the salt spray test instrument in conformity to JIS-Z2371, for 72 hours. Thereafter, the adhesive tape exfoliation test was performed, and it was followed by the evaluation according to the following criteria.
<Criteria>
⊚: The number of remained squares was 100.
○: The number of remained squares was in the range of 90 to 99.
Δ: The number of remained squares was in the range of 50 to 90.
x: The number of remained squares was less than 50.

5.4.3 Adhesion after Corrosion Resistant Test of Bent Part (OT+SST)

In conformity to the test method of JIS-G3312, the OT bend test where no inside spacing plate was sandwiched was applied to the individual test pieces at 20° C. The bent test piece was put into the salt spray test instrument in conformity to JIS-77371, for 72 hours. Thereafter, the adhesive tape exfoliation test was performed, the exfoliated state of the coating film was observed macroscopically, and evaluated according to the following criteria.
<Criteria>
⊚: No exfoliation was observed.
○: Exfoliated area was less than 10%.
Δ: Exfoliated area was not less than 10% and less than 50%.
x: Exfoliated area was not less than 50%.

6 Evaluation Results

Evaluation results of the tests are shown in Table 8 to Table 16. From Table 8, it is found that Examples 1 to 14 which satisfied the condition of containing a cationic urethane resin and a silicon compound of the chemical formula (I) and at least the condition that the Tc/Ta was in the defined range (12 to 3.0) among the conditions necessitated for constituting the composition for adhesion layer have no "x" evaluation in both of the bend adhesion and the adhesion after corrosion resistant test, as compared with Comparative Examples 1 and 2 in which the Tc/Ta was out of the defined range (1.2 to 3.0). Further, it is understood that Examples 2 to 7 in which the concentration of urethane groups of the cationic urethane resin was in the defined range (1 to 5 mmol/g) excel in the bend adhesion, the scratch resistance and the adhesion after corrosion resistant test, as compared with Examples 1 and 8 in which the concentration of urethane groups of the cationic urethane resin exceeded the defined range (1 to 5 mmol/g). This tendency are also observed in Examples 9 to 13 which had a different kind of polyol, as compared with Example 8.

Further, it is understood that Comparative Examples 1 and 3, in which the concentration of urethane groups was in the preferable range (1.5 to 4.5 mmol/g), while the Tc/Ta exceeded the defined range (1.2 to 3.0), are of inferior bend adhesion and inferior adhesion after corrosion resistant test. Furthermore, it is understood that Examples 4, 5, 10 to 12 in which both of the concentration of urethane groups and the Tc/Ta are in the optimum ranges (2 to 4 mmol/g, 1.8 to 2.2) excel in at least two of the bend adhesion, the scratch resistance and the adhesion after corrosion resistant test, as compared with Examples 2, 3, 6, 7, 9, 13 in which either or both of them is out of the optimum ranges. It is understood from the above points that it is necessary that at least the Tc/Ta is in the defined range, and preferably, the concentration of urethane groups is also in the defined range, in order to form an adhesion layer which can provide an extremely excellent adhesiveness to an coating film for the surface of steel sheet, wherein the adhesiveness is not ruined even if the coating film which has received any scratches or flaws, any working loads, or the like is exposed to the corrosive environment. In addition, it is understood that it is more desirable that the respective indicators are in their preferable ranges, and further, in their optimum ranges.

Incidentally, in Table 8, as a case that the Terra decreased, there is the case that the maximum temperature of the logarithmic decrement for the cationic urethane resin alone shifted to the higher temperature side. This is because the concentration of urethane groups of the urethane resin is high, and such a urethane resin shows a heightened rigidity. When the silicon compound is added to such a urethane resin, the interaction between the cationic urethane resin and the silicon compound becomes stronger than necessary, and the rigidity of the obtained adhesion layer strengthens further. As a result, this adhesion layer of high rigidity can not follow to the bending, but its scratch resistance becomes better by means of the physical resistance due to the silicon compound. On the other hand, as a case that the Tc/Ta increased, there is the case that the maximum temperature of the logarithmic decrement for the cationic urethane resin alone shifted to the lower temperature side. This is because the concentration of urethane groups of the urethane resin is low. Therefore, the number of urethane groups to form hydrogen bonds with the silicon compound becomes lower, and the interaction between the cationic urethane resin and the silicon compound becomes weaker. Thus, it is understood that there is a tendency of causing a degression in the adhesion or a degression in the adhesion after corrosion resistant test.

Further, from Table 8, it is understood that a fact that the concentration of urethane groups of the cationic urethane resin is high means that the crystallinity of the cationic urethane resin is high Therefore, when the adhesion layer is formed with a composition for adhesion layer which contains a cationic urethane resin having a high concentration of urethane groups, the cohesive force in the adhesion layer becomes high, and rigidity of the adhesion layer becomes excessively stronger. When such a tendency that the adhesion layer is excessively harder arises, the occurable incident tends to be the exfoliation of the adhesion layer in its intact form from the steel sheet surface rather than the exfoliation due to the cohesive failure within the adhesion layer. Thus, a defect that adhesion layer can not follow to the bending is caused. Similarly, when such a tendency that the adhesion layer is excessively harder arises, the boundary face between the adhesion layer and the substrate comes to entrap a space easily, and thus, a tendency that the adhesion after corrosion resistant test is also degraded arises. On the other hand, from the results of Examples 1 to 7 in Table 8, it is understood that there is a tendency that the bend adhesion is improved as the concentration of urethane groups lowers. However, when the concentration of urethane groups lowers further, a tendency that the adhesion layer exfoliates easily as maintaining its continuity arises at the time when receiving any scratches.

With respect to the concentration of hydrophilic groups of the cationic urethane resin, from Table 9, it is found that Examples 15 to 21 in which the concentration of hydrophilic groups was in the preferable range (0.2 to 2.0 mmol/g) excel in the storage stability, as compared with Example 14 in which the concentration of hydrophilic groups was less than the preferable range (0.2 to 2.0 mmol/g). In the case of Example 22 in which the concentration of hydrophilic groups exceeded the preferable range (0.2 to 2.0 mmol/g), it is understood that there is a tendency that the secondary OT adhesion or the adhesion after corrosion resistant test becomes inferior, although the storage stability is excellent. It is guessed that this is because the moisture absorption between layers becomes remarkable when hydrophilic groups exist excessively high in the adhesion layer. Further, it is understood that Examples 17 to 20 in which the concentration of hydrophilic groups was in the optimum range (0.3 to 2.0 mmol/g) excel in the storage stability, as compared with Examples 15 and 16 in which the concentration of hydrophilic groups was less than the optimum range (0.3 to 2.0 mmol/g); and Examples 17 to 20 excel in the bend adhesion and the adhesion after corrosion resistant test, as compared with Example 21 in which the concentration of hydrophilic groups exceeded the optimum range (0.3 to 2.0 mmol/g). It is understood from the above points that it is necessary that the concentration of hydrophilic groups is in the defined range (0.1 to 3.0 mmol/n), preferably, in the preferable range (0.2 to 2.0 mmol/g), and most preferably, in the optimum range (0.3 to 2.0 mmol/g), in order to form an adhesion layer which can provide an extremely excellent adhesiveness to an paint coating, wherein the adhesiveness is not mined even if the coating film which has received any scratches or flaws, any working loads, or the like is exposed to the corrosive environment.

With respect to the solid content solid content mass ratio NB, from Table 10, it is understood that Examples 7 and 24 to 29 in which the concentration of urethane groups was relatively low, and the A/B was in the defined range (1.0 to 4.0) excel in the secondary OT adhesion, the scratch resistance, and the cross-cut+SST about the adhesion after corrosion resistant test, as compared with Example 23 in which the A/B was less than the defined range (1.0 to 4.0), and Examples 7 and 24 to 29 excel in the bend adhesion and the adhesion after corrosion resistant test, as compared with Comparative Example 4 in which the NB exceeded the defined range (1.0 to 4.0) and the Tc/Ta is less than the defined range (1.2 to 3.0). Next, it is understood that Examples 11 and 31 to 35 in which the concentration of urethane groups lay roughly middle range, and the A/B was in the defined range (1.0 to 4.0) excel in the bend adhesion and the adhesion after corrosion resistant test, as compared with Example 30 in which the A/B was less than the defined range (1.0 to 4.0) and Comparative Example 6 in which the Tc/Ta is less than the defined range (12 to 3.0). Further, it is understood that Examples 36 to 39 in which the concentration of urethane groups was relatively high, and the A/B was in the defined range (1.0 to 4.0) excel in the bend adhesion and the adhesion after corrosion resistant test, as compared with Comparative Example 7 in which the A/B was less than the defined range (1.0 to 4.0) and the Tc/Ta is less than the defined range (12 to 3.0) and Comparative Example 10 in which the A/B exceeded the defined range (1.0 to 4.0) and the Tc/Ta is less than the defined range (1.2 to 3.0). Further, Examples 7 and 26 to 27, and Example 11 and 33 to 34 in which the A/B was in the optimum range (1.3 to 2.0) tend to excel in the bend adhesion and the adhesion after corrosion resistant test, as compared with Examples 24 to 25, 28 to 32, and 35 in which the A/B was out of the optimum range (1.3 to 2.0). Particularly, it is understood that Examples 11 and 33 in which both of the concentration of urethane groups and the Tc/Ta were in their individual optimum ranges (2.0 to 4.0 mmol/g, 1.8 to 2.2) show extremely excellent performance in all.

From the results of Table 10, it is understood that since a fact that the A/B is low means that the amount of the silicon compound is relatively high, the interaction between the silicon compound and the cationic urethane resin becomes stronger, and thither, the number of Si—O—Si bonds increases, in such a case. As a result, the tendencies that the formation of entanglement, hydrogen bonds and siloxane bond becomes strongly, the rigidity of the adhesion layer becomes high, this adhesion layer of high rigidity can not follow to the bending, and the bend adhesion is hardly obtained, arise. On the other hand, a fact that the A/B is high means that the amount of the silicon compound is relatively low. Thus, the interaction due to the silicon compound additive becomes weaker, and further, the adhesiveness to the steel sheet surface becomes low. As a result, a tendency that the bend adhesion becomes low arises.

As shown in Tables 11 to 13, it is found that Examples 40 to 67 which contains mutually different kind of polyol or mutually different kind of isocyanate did not show a significant difference in each property. From this fact, it is understood that as far as the composition satisfies the condition of containing the cationic urethane resin and the silicone compound of the chemical formula (I) and the condition that the Tc/Ta is at least in the defined range (12 to 3.0), more preferably, the conditions that the concentration of urethane groups, the concentration of hydrophilic groups, and the A/B are in their individual defined ranges, among the conditions which constitute the composition for adhesion layer, the excellent properties can be obtained without being influenced with the monomers which constitutes the cationic urethane resin.

From Table 14, it is found that Examples 4, and 68 to 70 which contained the silicon compound (B) represented by the above-mentioned chemical formula (I) excel in all properties, as compared with Comparative Examples 11 and 12 which contained a silicon compound other than the compound represented by the above-mentioned chemical formula (I). Further, it is found that Examples 4 and 68 which contained the silicon compound of B1 or B2 excel in the adhesion after corrosion resistant test, as compared with Examples 69 to 70, and thus they are most profitable ones.

With respect to this fact, when the silicone compound (B) is the silicon compound having amino group as shown in the chemical formula (I), the amino group forms hydrogen bond with the urethane group which is owned by the cationic urethane resin (A). Thus, it is considered that the interaction between the cationic urethane resin (A) and the silicon compound (B) is occurred, and the rigidity is provided for the obtained adhesion layer. On the other hand, in the case of the epoxy silane having epoxy group or the vinyl silane having vinyl group, it is considered that the interaction as mentioned above is not caused, and which results in the merely mixed state. Therefore, the excellent performance is not obtained at all in any property. In the case that amino silane was mixed with the epoxy silane or vinyl silane, the results are similar to above.

From Table 15, with respect to the thickness of the adhesion layer, 50 to 200 mg/m$^2$ was the most profitable range as clearly understood from Examples 11, 71 to 73, and 500 mg/m$^2$ was inferior slightly. Since the silicon compound (B) reacts with the steel sheet surface by means of its molecular terminal end Si—OH, the silicon compound is concentrated to the region adjacent the steel sheet surface. Thus, the effect of the silicon compound appears strongly at the region closely adjacent the steel sheet surface. Therefore, it is considered that a portion where the effect of the silicon compound is not expected greatly would be created, when the adhesion layer thickens so as to exceed 200 mg/m$^2$ and to be about 500 mg/m$^2$, and thereby, the tendency that a part of the adhesion properties or the scratch resistance is degraded slightly arises.

Further, from Examples 74 to 76, it is understood that as far as the adhesion layer is formed by the composition (X) for the adhesion layer, the adhesion layer thus obtained is not influenced with the intermediate layer or upper layer which is formed on the adhesion layer. That is, since the composition for the adhesion layer contains the cationic urethane resin and the silicon compound represented by the aforementioned general formula (I), it is said that the adhesion improvement effect of the adhesion layer formed by this composition is not the adhesion improvement effect due to the organic cross-linking, but the adhesion improvement effect due to the hydrogen bond and/or entanglement. Therefore, it is considered that the adhesion layer functions so as to maintain the adhesiveness with alleviating the internal stress caused by the difference in hardness between the intermediate layer (upper layer) and the steel sheet, since the adhesion layer is not a rigid film as the cross-linked one. As a result, differing from the conventional chromate (adhesiveness due to cross-linking), silica-containing adhesion layer (anchoring effect), cross-linking organic adhesion layer (anionic resin, isocyanate type, carbodiimide type, etc.), the functions and effects of such an adhesion layer is not influenced with the kind of the intermediate layer or upper layer. Thus, even when providing onto the adhesion layer an intermediate layer or upper layer which type is the different from the type of the adhesion layer, the adhesion layer can exhibit the equivalent adhesiveness.

From Table 16, it is understood that Comparative Examples 13 to 20 which each referred to the example in individual Patent Literature were inferior in at least one of the bend adhesion, the scratch resistance and the adhesion after corrosion resistant test. Since these Comparative Examples were inferior in, particularly, the adhesion after corrosion resistant test, especially the adhesion after corrosion resistant test of bent part, it is understood that the effect of the adhesion layer formed by the composition for adhesion layer according to the present invention is remarkable, and the technological advance thereof is clear. From these results, it is understood that as far as the composition satisfies the condition of containing the cationic urethane resin and the silicone compound of the chemical formula (I) and the condition that the Tc/Ta is at least in the defined range (1.2 to 3.0), more preferably, the conditions that the concentration of urethane groups, the concentration of hydrophilic groups, and the A/B are in their individual defined ranges, among the conditions which constitute the composition for adhesion layer, the composition shows remarkable effects.

TABLE 1

| | Kind of polyol |
|---|---|
| P1 | Tetramethylene glycol |
| P2 | Ethylene glycol |
| P3 | Hexamethylene glycol |
| P4 | 1,4-cydohexyl glycol |
| P5 | Bisphenol A |
| P6 | Hexamethylene glycol |

TABLE 2

| | Kind of polycarboxylic acid |
|---|---|
| Q1 | Adipic acid |
| Q2 | Succinic acid |
| Q3 | Suberic acid |
| Q4 | Sebacic acid |
| Q5 | Terephthalic acid |

TABLE 3

| Abbreviation | Kind of isocyanate | Number of NCO | Molecular weight |
|---|---|---|---|
| HMDI | Hexamethylene diisocyanate | 2 | 168 |
| IPDI | Isophorone diisocyanate | 2 | 222 |
| H6XDI | 1,4-cyclohexane bismethyl isocyanate | 2 | 194 |
| H12MDI | 4,4-methylene biscyclohexyl isocyanate | 2 | 262 |

TABLE 4

| | a1 | | | | | a2 | | a3 | |
|---|---|---|---|---|---|---|---|---|---|
| | | Content | | | | | | | |
| No. | Polyol | Polycarboxylic acid | Number of EO addition | Carbonate | Part by mass | Kind | Part by mass | Kind | Part by mass |
| A1 | P1 | Q1 | — | — | 150 | HMDI | 45.4 | S1 | 20 |
| A2 | P1 | Q2 | — | — | 135.5 | HMDI | 45.4 | S1 | 20 |
| A3 | P1 | Q3 | — | — | 164.5 | HMDI | 45.4 | S1 | 20 |
| A4 | P1 | Q4 | — | — | 179 | HMDI | 45.4 | S1 | 20 |
| A5 | P1 | Q5 | — | — | 160.3 | HMDI | 45.4 | S1 | 20 |
| A6 | P1 | Q1 | — | — | 150 | IPDI | 59.9 | S1 | 20 |
| A7 | P1 | Q1 | — | — | 150 | H6XDI | 52.4 | S1 | 20 |
| A8 | P1 | Q1 | — | — | 150 | H12MDI | 70.7 | S1 | 20 |
| A9 | P1 | Q1 | — | — | 58 | IPDI | 104.3 | S1 | 15 |
| A10 | P1 | Q1 | — | — | 72.5 | IPDI | 93.2 | S1 | 15 |
| A11 | P1 | Q1 | — | — | 87 | IPDI | 82.1 | S1 | 16 |
| A12 | P1 | Q1 | — | — | 101.5 | IPDI | 71 | S1 | 16 |
| A13 | P1 | Q1 | — | — | 116 | IPDI | 59.9 | S1 | 16 |
| A14 | P1 | Q1 | — | — | 130.5 | IPDI | 48.8 | S1 | 17 |
| A15 | P1 | Q1 | — | — | 145 | IPDI | 37.7 | S1 | 17 |
| A16 | P1 | Q1 | — | — | 159.5 | IPDI | 26.6 | S1 | 17 |
| A17 | P1 | Q1 | — | — | 168.2 | IPDI | 20 | S1 | 17 |
| A18 | P2 | Q1 | — | — | 81.9 | IPDI | 71 | S1 | 14 |
| A19 | P3 | Q1 | — | — | 103.8 | IPDI | 82.1 | S1 | 17 |
| A20 | P4 | Q1 | — | — | 102.6 | IPDI | 82.1 | S1 | 18 |
| A21 | P2 | Q5 | — | — | 88.9 | IPDI | 71 | S1 | 15 |
| A22 | P3 | Q5 | — | — | 109.8 | IPDI | 82.1 | S1 | 18 |
| A23 | P4 | Q5 | — | — | 108.6 | IPDI | 82.1 | S1 | 19 |
| A24 | P4 | Q2 | — | — | 94.2 | IPDI | 82.1 | S1 | 17 |
| A25 | P4 | Q3 | — | — | 111 | IPDI | 82.1 | S1 | 19 |
| A26 | P4 | Q4 | — | — | 119.4 | IPDI | 82.1 | S1 | 19 |
| A27 | P4 | — | 0 | — | 40.6 | IPDI | 71 | S1 | 11 |
| A28 | P4 | — | 0 | — | 46.4 | IPDI | 59.9 | S1 | 11 |
| A29 | P4 | — | 0 | — | 52.2 | IPDI | 48.8 | S1 | 10 |
| A30 | P4 | — | 0 | — | 58 | IPDI | 37.7 | S1 | 10 |

TABLE 5

| | a1 | | | | | a2 | | a3 | |
|---|---|---|---|---|---|---|---|---|---|
| | | Content | | | | | | | |
| No. | Polyol | Polycarboxylic acid | Number of EO addition | Carbonate | Part by mass | Kind | Part by mass | Kind | Part by mass |
| A31 | P4 | — | 0 | — | 60.3 | IPDI | 33.3 | S1 | 9 |
| A32 | P4 | — | 0 | — | 63.8 | IPDI | 26.6 | S1 | 9 |

TABLE 5-continued

|  | a1 | | | | a2 | | a3 | |
| --- | --- | --- | --- | --- | --- | --- | --- | --- |
|  | Content | | | | | | | |
| No. | Polyol | Polycarboxylic acid | Number of EO addition | Carbonate | Part by mass | Kind | Part by mass | Kind | Part by mass |
| A33 | P4 | — | 0 | — | 69.6 | IPDI | 15.5 | S1 | 9 |
| A34 | P4 | — | 1 | — | 72 | IPDI | 48.8 | S1 | 9 |
| A35 | P4 | — | 2 | — | 81.6 | IPDI | 59.9 | S1 | 9 |
| A36 | P4 | — | 4 | — | 102.2 | IPDI | 71 | S1 | 9 |
| A37 | P4 | — | 0 | — | 58 | IPDI | 37.7 | S1 | 1 |
| A38 | P4 | — | 0 | — | 58 | IPDI | 37.7 | S1 | 1.2 |
| A39 | P4 | — | 0 | — | 58 | IPDI | 37.7 | S1 | 2.3 |
| A40 | P4 | — | 0 | — | 58 | IPDI | 37.7 | S1 | 3.5 |
| A41 | P4 | — | 0 | — | 58 | IPDI | 37.7 | S1 | 10 |
| A42 | P4 | — | 0 | — | 58 | IPDI | 37.7 | S1 | 13 |
| A43 | P4 | — | 0 | — | 58 | IPDI | 37.7 | S1 | 30 |
| A44 | P4 | — | 0 | — | 58 | IPDI | 37.7 | S1 | 50 |
| A45 | P4 | — | 0 | — | 58 | IPDI | 37.7 | S1 | 55 |
| A46 | P5 | — | 1 | — | 110.6 | IPDI | 71 | S1 | 20 |
| A47 | P5 | — | 2 | — | 125.2 | IPDI | 79.9 | S1 | 23 |
| A48 | P5 | — | 3 | — | 137.8 | IPDI | 86.6 | S1 | 25 |
| A49 | P5 | — | 4 | — | 145 | IPDI | 93.2 | S1 | 26 |
| A50 | P1 | — | — | R1 | 80.1 | IPDI | 48.8 | S1 | 15 |
| A51 | P6 | — | — | R1 | 88.6 | IPDI | 53.3 | S1 | 16 |
| A52 | P5 | — | — | R1 | 113.8 | IPDI | 68.8 | S1 | 20 |

TABLE 6

|  | Concentration of urethane groups | Concentration of hydrophilic groups | Ta |
| --- | --- | --- | --- |
| A1 | 2.51 | 0.78 | 59.6 |
| A2 | 2.69 | 0.84 | 62.7 |
| A3 | 2.35 | 0.73 | 56.9 |
| A4 | 2.21 | 0.69 | 54.6 |
| A5 | 2.39 | 0.74 | 63.4 |
| A6 | 2.35 | 0.73 | 68.3 |
| A7 | 2.43 | 0.76 | 69.9 |
| A8 | 2.24 | 0.7 | 66.2 |
| A9 | 5.3 | 0.71 | 128.5 |
| A10 | 4.65 | 0.7 | 115.2 |
| A11 | 4 | 0.73 | 101.9 |
| A12 | 3.39 | 0.71 | 89.6 |
| A13 | 2.81 | 0.7 | 77.8 |
| A14 | 2.24 | 0.73 | 66.1 |
| A15 | 1.7 | 0.72 | 55.1 |
| A16 | 1.18 | 0.7 | 44.5 |
| A17 | 0.88 | 0.7 | 38.3 |
| A18 | 3.83 | 0.7 | 98.6 |
| A19 | 3.65 | 0.7 | 94.8 |
| A20 | 3.65 | 0.75 | 94.9 |
| A21 | 3.66 | 0.72 | 104.5 |
| A22 | 3.52 | 0.72 | 101.5 |
| A23 | 3.53 | 0.76 | 101.6 |
| A24 | 3.83 | 0.74 | 98.5 |
| A25 | 3.49 | 0.75 | 91.6 |
| A26 | 3.36 | 0.72 | 88.9 |
| A27 | 5.22 | 0.75 | 126.9 |
| A28 | 4.6 | 0.79 | 114.3 |
| A29 | 3.96 | 0.76 | 101.2 |
| A30 | 3.22 | 0.79 | 86 |
| A31 | 2.92 | 0.74 | 80 |
| A32 | 2.41 | 0.76 | 69.9 |
| A33 | 1.49 | 0.8 | 50.7 |
| A34 | 3.39 | 0.58 | 89.5 |
| A35 | 3.59 | 0.5 | 93.6 |
| A36 | 3.51 | 0.42 | 92 |
| A37 | 3.51 | 0.09 | 92.1 |
| A38 | 3.51 | 0.1 | 91.9 |
| A39 | 3.47 | 0.2 | 91.1 |
| A40 | 3.43 | 0.3 | 90.3 |
| A41 | 3.22 | 0.79 | 86 |
| A42 | 3.11 | 1 | 86.9 |
| A43 | 2.7 | 2 | 75.6 |
| A44 | 2.33 | 2.88 | 68 |
| A45 | 2.26 | 3.07 | 66.4 |
| A46 | 3.17 | 0.83 | 93.7 |
| A47 | 3.16 | 0.85 | 93.3 |
| A48 | 3.13 | 0.84 | 92.6 |
| A49 | 3.18 | 0.83 | 93.8 |
| A50 | 3.06 | 0.88 | 82.8 |
| A51 | 3.04 | 0.85 | 82.4 |
| A52 | 3.06 | 0.83 | 91.1 |

TABLE 7

|  | Silicon compound |
| --- | --- |
| B1 | 3-Amino propyl trimethoxy silane |
| B2 | 3-Amino propyl triethoxy silane |
| B3 | 3-Amino propyl trimethyl diethoxy silane |
| B4 | N-2(amino ethyl)-3-amino propyl trimethoxy silane |
| B5 | 3-glycidoxy propyl trimethoxy silane |
| B6 | Vinyl triethoxy silane |

TABLE 8A

| | Urethane resin (A) | | | | Silicon compound (B) | A/B | Tc | Tc/Ta |
|---|---|---|---|---|---|---|---|---|
| | Kind | Concentration of urethane group | Concentration of hydrophilic group | Ta | | | | |
| Example 1 | A9 | 5.3 | 0.71 | 128.5 | B1 | 1.5 | 188.4 | 1.5 |
| Example 2 | A10 | 4.65 | 0.7 | 115.2 | B1 | 1.5 | 183 | 1.6 |
| Example 3 | A11 | 4 | 0.73 | 101.9 | B1 | 1.5 | 177.6 | 1.7 |
| Example 4 | A12 | 3.39 | 0.71 | 89.6 | B1 | 1.5 | 172.6 | 1.9 |
| Example 5 | A13 | 2.81 | 0.7 | 77.8 | B1 | 1.5 | 167.8 | 2.2 |
| Example 6 | A14 | 2.24 | 0.73 | 66.1 | B1 | 1.5 | 163.1 | 2.5 |
| Example 7 | A15 | 1.7 | 0.72 | 55.1 | B1 | 1.5 | 158.6 | 2.9 |
| Comparative Example 1 | A16 | 1.18 | 0.7 | 44.5 | B1 | 1.5 | 154.3 | 3.5 |
| Comparative Example 2 | A17 | 0.88 | 0.7 | 38.3 | B1 | 1.5 | 151.8 | 4 |
| Example 8 | A27 | 5.22 | 0.75 | 126.9 | B1 | 1.5 | 187.7 | 1.5 |
| Example 9 | A28 | 4.6 | 0.79 | 114.3 | B1 | 1.5 | 182.6 | 1.6 |
| Example 10 | A29 | 3.96 | 0.76 | 101.2 | B1 | 1.5 | 177.3 | 1.8 |
| Example 11 | A30 | 3.22 | 0.79 | 86 | B1 | 1.5 | 171.1 | 2 |
| Example 12 | A31 | 2.92 | 0.74 | 80 | B1 | 1.5 | 168.7 | 2.1 |
| Example 13 | A32 | 2.41 | 0.76 | 69.6 | B1 | 1.5 | 164.5 | 2.4 |
| Comparative Example 3 | A33 | 1.49 | 0.8 | 50.7 | B1 | 1.5 | 156.8 | 3.1 |

TABLE 8B

| | Bend adhesion | | | Scratch resistance | | Adhesion after corrosion resistant test | | | Storage stability |
|---|---|---|---|---|---|---|---|---|---|
| | Primary 0T 20° C. | Secondary 0T 20° C. | Primary 0T −15° C. | Primary | Secondary | Cross cut + SST | Cross cut + Er + SST | 0T + SST | |
| Example 1 | Δ | Δ | Δ | ○ | ○ | Δ | Δ | Δ | ⊚ |
| Example 2 | ○ | ○ | ○ | ○ | ○ | ○ | ○ | ○ | ⊚ |
| Example 3 | ⊚ | ○ | ○ | ⊚ | ○ | ⊚ | ○ | ○ | ⊚ |
| Example 4 | ⊚ | ⊚ | ○ | ⊚ | ⊚ | ⊚ | ⊚ | ⊚ | ⊚ |
| Example 5 | ⊚ | ⊚ | ○ | ⊚ | ⊚ | ⊚ | ⊚ | ⊚ | ⊚ |
| Example 6 | ⊚ | ⊚ | ○ | ⊚ | ⊚ | ⊚ | ○ | ○ | ⊚ |
| Example 7 | ⊚ | ⊚ | ○ | ⊚ | ⊚ | ⊚ | ○ | ○ | ⊚ |
| Comparative Example 1 | ○ | ○ | Δ | ⊚ | ⊚ | Δ | Δ | X | ⊚ |
| Comparative Example 2 | Δ | Δ | X | ⊚ | ⊚ | X | X | X | ⊚ |
| Example 8 | Δ | Δ | Δ | ○ | ○ | Δ | Δ | Δ | ⊚ |
| Example 9 | ○ | ○ | ○ | ⊚ | ⊚ | ○ | ○ | ○ | ⊚ |
| Example 10 | ⊚ | ⊚ | ○ | ⊚ | ⊚ | ⊚ | ⊚ | ⊚ | ⊚ |
| Example 11 | ⊚ | ⊚ | ⊚ | ⊚ | ⊚ | ⊚ | ⊚ | ⊚ | ⊚ |
| Example 12 | ⊚ | ⊚ | ⊚ | ⊚ | ⊚ | ⊚ | ⊚ | ⊚ | ⊚ |
| Example 13 | ⊚ | ⊚ | ○ | ⊚ | ⊚ | ⊚ | ○ | ○ | ⊚ |
| Comparative Example 3 | ○ | ○ | Δ | ⊚ | ⊚ | ○ | Δ | X | ⊚ |

<Bend adhesion & Adhesion after corrosion resistant test (0T + SST)>
⊚: No exfoliation was observed, ○: Exfoliated area was less than 10%, Δ: Exfoliated area was not less than 10% and less than 50%, and X: Exfoliated area was not less than 50%.
<Scratch resistance>
⊚: Exfoliated area was less than 10%, ○: Exfoliated area was not less than 10% and less than 20%, Δ: Exfoliated area was not less than 20% and less than 50%, and X: Exfoliated area was not less than 50%.
<Adhesion after corrosion resistant test (cross cut + SST, cross cut + Er + SST)>
⊚: The number of remained squares was 100, ○: The number of remained squares was in the range of 90 to 99, Δ: The number of remained squared was in the range of 50 to 90, and X: The number of remained squares was less than 50.
<Storage stability>
⊚: Excellent, ○: Good, Δ: Average, X: Bad.

TABLE 9A

| | Urethane resin (A) | | | | Silicon compound (B) | A/B | Tc | Tc/Ta |
|---|---|---|---|---|---|---|---|---|
| | Kind | Concentration of urethane group | Concentration of hydrophilic group | Ta | | | | |
| Example 14 | A37 | 3.51 | 0.09 | 92.1 | B1 | 1.5 | 173.6 | 1.9 |
| Example 15 | A38 | 3.51 | 0.1 | 91.9 | B1 | 1.5 | 173.5 | 1.9 |
| Example 16 | A39 | 3.47 | 0.2 | 91.1 | B1 | 1.5 | 173.2 | 1.9 |
| Example 17 | A40 | 3.43 | 0.3 | 90.3 | B1 | 1.5 | 172.9 | 1.9 |
| Example 18 | A41 | 3.22 | 0.79 | 86 | B1 | 1.5 | 171.1 | 2 |
| Example 19 | A42 | 3.11 | 1 | 83.9 | B1 | 1.5 | 170.3 | 2 |
| Example 20 | A43 | 2.7 | 2 | 75.6 | B1 | 1.5 | 166.9 | 2.2 |
| Example 21 | A44 | 2.33 | 2.88 | 68 | B1 | 1.5 | 163.8 | 2.4 |
| Example 22 | A45 | 2.26 | 3.07 | 66.4 | B1 | 1.5 | 163.2 | 2.5 |

TABLE 9B

| | Bend adhesion | | | Scratch resistance | | Adhesion after corrosion resistant test | | | Storage stability |
|---|---|---|---|---|---|---|---|---|---|
| | Primary 0T 20° C. | Secondary 0T 20° C. | Primary 0T −15° C. | Primary | Secondary | Cross cut +SST | Cross cut +Er +SST | 0T +SST | |
| Example 14 | ◎ | ◎ | ○ | ◎ | ◎ | ◎ | ◎ | ◎ | △ |
| Example 15 | ◎ | ◎ | ○ | ◎ | ◎ | ◎ | ◎ | ◎ | ○ |
| Example 16 | ◎ | ◎ | ○ | ◎ | ◎ | ◎ | ◎ | ◎ | ○ |
| Example 17 | ◎ | ◎ | ○ | ◎ | ◎ | ◎ | ◎ | ◎ | ◎ |
| Example 18 | ◎ | ◎ | ○ | ◎ | ◎ | ◎ | ◎ | ◎ | ◎ |
| Example 19 | ◎ | ◎ | ○ | ◎ | ◎ | ◎ | ◎ | ◎ | ◎ |
| Example 20 | ◎ | ◎ | ○ | ◎ | ◎ | ◎ | ◎ | ◎ | ◎ |
| Example 21 | ◎ | ○ | ○ | ◎ | ○ | ○ | ○ | ○ | ◎ |
| Example 22 | ◎ | △ | ○ | ◎ | △ | △ | △ | △ | ◎ |

The meaning of each symbol (double circle, circle, triangle and cross) is shown in Table 8B.

TABLE 10A

| | Urethane resin (A) | | | | Silicon compound (B) | A/B | Tc | Tc/Ta |
|---|---|---|---|---|---|---|---|---|
| | Kind | Concentration of urethane group | Concentration of hydrophilic group | Ta | | | | |
| Example 23 | A15 | 1.7 | 0.72 | 55.1 | B1 | 0.8 | 124 | 2.2 |
| Example 24 | A15 | 1.7 | 0.72 | 55.1 | B1 | 1 | 136.3 | 2.5 |
| Example 25 | A15 | 1.7 | 0.72 | 55.1 | B1 | 1.2 | 146.3 | 2.7 |
| Example 26 | A15 | 1.7 | 0.72 | 55.1 | B1 | 1.3 | 150.7 | 2.7 |
| Example 7 | A15 | 1.7 | 0.72 | 55.1 | B1 | 1.5 | 158.6 | 2.9 |
| Example 27 | A15 | 1.7 | 0.72 | 55.1 | B1 | 2 | 147.1 | 2.7 |
| Example 28 | A15 | 1.7 | 0.72 | 55.1 | B1 | 3 | 119.5 | 2.2 |
| Example 29 | A15 | 1.7 | 0.72 | 55.1 | B1 | 4 | 97.2 | 1.8 |
| Comparative Example 4 | A15 | 1.7 | 0.72 | 55.1 | B1 | 5 | 79 | 0.9 |
| Example 30 | A30 | 3.22 | 0.79 | 86 | B1 | 0.8 | 117.1 | 1.4 |
| Example 31 | A30 | 3.22 | 0.79 | 86 | B1 | 1 | 136.3 | 1.6 |
| Example 32 | A30 | 3.22 | 0.79 | 86 | B1 | 1.2 | 151.9 | 1.8 |
| Example 33 | A30 | 3.22 | 0.79 | 86 | B1 | 1.3 | 158.8 | 1.8 |
| Example 11 | A30 | 3.22 | 0.79 | 86 | B1 | 1.5 | 171.1 | 2 |
| Example 34 | A30 | 3.22 | 0.79 | 86 | B1 | 2 | 147.1 | 1.7 |
| Example 35 | A30 | 3.22 | 0.79 | 86 | B1 | 3 | 119.5 | 1.4 |
| Comparative Example 5 | A30 | 3.22 | 0.79 | 86 | B1 | 4 | 97.2 | 1.1 |
| Comparative Example 6 | A30 | 3.22 | 0.79 | 87 | B1 | 5 | 79 | 0.9 |
| Comparative Example 7 | A28 | 4.6 | 0.79 | 114.3 | B1 | 0.8 | 110.7 | 1 |
| Example 36 | A28 | 4.6 | 0.79 | 114.3 | B1 | 1 | 136.3 | 1.2 |
| Example 37 | A28 | 4.6 | 0.79 | 114.3 | B1 | 1.2 | 157.1 | 1.4 |
| Example 38 | A28 | 4.6 | 0.79 | 114.3 | B1 | 1.3 | 166.2 | 1.5 |
| Example 9 | A28 | 4.6 | 0.79 | 114.3 | B1 | 1.5 | 182.6 | 1.6 |
| Example 39 | A28 | 4.6 | 0.79 | 114.3 | B1 | 2 | 147.1 | 1.3 |
| Comparative Example 8 | A28 | 4.6 | 0.79 | 114.3 | B1 | 3 | 119.5 | 1 |

TABLE 10A-continued

| | Urethane resin (A) | | | | Silicon compound (B) | A/B | Tc | Tc/Ta |
|---|---|---|---|---|---|---|---|---|
| | Kind | Concentration of urethane group | Concentration of hydrophilic group | Ta | | | | |
| Comparative Example 9 | A28 | 4.6 | 0.79 | 114.3 | B1 | 4 | 97.2 | 0.9 |
| Comparative Example 10 | A28 | 4.6 | 0.79 | 114.3 | B1 | 5 | 79 | 0.7 |

TABLE 10B

| | Bend adhesion | | | Scratch resistance | | Adhesion after corrosion resistant test | | | Storage stability |
|---|---|---|---|---|---|---|---|---|---|
| | Primary 0T 20° C. | Secondary 0T 20° C. | Primary 0T −15° C. | Primary | Secondary | Cross cut + SST | Cross cut + Er + SST | 0T + SST | |
| Example 23 | ◎ | ○ | ○ | Δ | ○ | ○ | ○ | Δ | ◎ |
| Example 24 | ◎ | ○ | ○ | ○ | ○ | ○ | ○ | ○ | ◎ |
| Example 25 | ◎ | ◎ | ○ | ○ | ○ | ○ | ○ | ○ | ◎ |
| Example 26 | ◎ | ◎ | ○ | ◎ | ◎ | ◎ | ○ | ○ | ◎ |
| Example 7 | ◎ | ◎ | ○ | ◎ | ◎ | ◎ | ○ | ○ | ◎ |
| Example 27 | ◎ | ◎ | ○ | ◎ | ◎ | ◎ | ○ | ○ | ◎ |
| Example 28 | ◎ | ◎ | ○ | ◎ | ◎ | ◎ | ○ | ○ | ◎ |
| Example 29 | ○ | ○ | Δ | ◎ | ◎ | ○ | ○ | ○ | ◎ |
| Comparative Example 4 | Δ | Δ | X | ◎ | ◎ | ○ | Δ | Δ | ◎ |
| Example 30 | ○ | Δ | Δ | ◎ | ◎ | ○ | ○ | Δ | ◎ |
| Example 31 | ○ | ○ | ○ | ◎ | ◎ | ◎ | ◎ | ○ | ◎ |
| Example 32 | ◎ | ◎ | ◎ | ◎ | ◎ | ◎ | ◎ | ◎ | ◎ |
| Example 33 | ◎ | ◎ | ◎ | ◎ | ◎ | ◎ | ◎ | ◎ | ◎ |
| Example 11 | ◎ | ◎ | ◎ | ◎ | ◎ | ◎ | ◎ | ◎ | ◎ |
| Example 34 | ◎ | ◎ | ◎ | ◎ | ◎ | ◎ | ◎ | ○ | ◎ |
| Example 35 | ◎ | ○ | ○ | ◎ | ◎ | ◎ | ◎ | ○ | ◎ |
| Comparative Example 5 | ○ | ○ | X | ◎ | ◎ | ◎ | ○ | Δ | ◎ |
| Comparative Example 6 | ○ | X | X | ◎ | ◎ | ○ | ○ | Δ | ◎ |
| Comparative Example 7 | ○ | X | X | ○ | ○ | ○ | ○ | Δ | ◎ |
| Example 36 | ○ | ○ | ○ | ◎ | ◎ | ○ | ○ | ○ | ◎ |
| Example 37 | ○ | ○ | ○ | ◎ | ◎ | ○ | ○ | ○ | ◎ |
| Example 38 | ○ | ○ | ○ | ◎ | ◎ | ○ | ○ | ○ | ◎ |
| Example 9 | ○ | ○ | ○ | ◎ | ◎ | ○ | ○ | ○ | ◎ |
| Example 39 | ○ | ○ | ○ | ◎ | ◎ | ○ | ○ | ○ | ◎ |
| Comparative Example 8 | ○ | ○ | X | ◎ | ◎ | ○ | ○ | ○ | ◎ |
| Comparative Example 9 | ○ | X | X | ◎ | ◎ | ○ | ○ | X | ◎ |
| Comparative Example 10 | Δ | X | X | ◎ | ◎ | ○ | X | X | ◎ |

The mean of each symbol (double circle, circle, triangle and cross) is shown in TABLE 8B.

TABLE 11A

| | Urethane resin (A) | | | | Silicon compound (B) | A/B | Tc | Tc/Ta |
|---|---|---|---|---|---|---|---|---|
| | Kind | Concentration of urethane group | Concentration of hydrophilic group | Ta | | | | |
| Example 40 | A1 | 2.51 | 0.78 | 59.6 | B1 | 1.5 | 160.4 | 2.7 |
| Example 41 | A2 | 2.69 | 0.84 | 62.7 | B1 | 1.5 | 161.7 | 2.6 |
| Example 42 | A3 | 2.35 | 0.73 | 56.9 | B1 | 1.5 | 159.3 | 2.8 |
| Example 43 | A4 | 2.21 | 0.69 | 54.6 | B1 | 1.5 | 158.4 | 2.9 |
| Example 44 | A5 | 2.39 | 0.74 | 63.4 | B1 | 1.5 | 162 | 2.6 |

TABLE 11B

| | Bend adhesion | | | Scratch resistance | | Adhesion after corrosion resistant test | | | Storage stability |
|---|---|---|---|---|---|---|---|---|---|
| | Primary 0T 20° C. | Secondary 0T 20° C. | Primary 0T −15° C. | Primary | Secondary | Cross cut + SST | Cross cut + Er + SST | 0T + SST | |
| Example 40 | ◎ | ◎ | ○ | ◎ | ◎ | ◎ | ○ | ○ | ◎ |
| Example 41 | ◎ | ◎ | ○ | ◎ | ◎ | ◎ | ○ | ○ | ◎ |
| Example 42 | ◎ | ◎ | ○ | ◎ | ◎ | ◎ | ○ | ○ | ◎ |
| Example 43 | ◎ | ◎ | ○ | ◎ | ◎ | ◎ | ○ | ○ | ◎ |
| Example 44 | ◎ | ◎ | ○ | ◎ | ◎ | ◎ | ○ | ○ | ◎ |

The mean of each symbol (double circle, circle, triangle and cross) is shown in TABLE 8B.

TABLE 12A

| | Urethane resin (A) | | | | Silicon compound (B) | A/B | Tc | Tc/Ta |
|---|---|---|---|---|---|---|---|---|
| | Kind | Concentration of urethane group | Concentration of hydrophilic group | Ta | | | | |
| Example 45 | A1 | 2.51 | 0.78 | 59.6 | B1 | 1.5 | 160.4 | 2.7 |
| Example 46 | A6 | 2.35 | 0.73 | 68.3 | B1 | 1.5 | 163.9 | 2.4 |
| Example 47 | A7 | 2.43 | 0.76 | 69.9 | B1 | 1.5 | 164.6 | 2.4 |
| Example 48 | A8 | 2.24 | 0.7 | 66.2 | B1 | 1.5 | 163.1 | 2.5 |

TABLE 12B

| | Bend adhesion | | | Scratch resistance | | Adhesion after corrosion resistant test | | | Storage stability |
|---|---|---|---|---|---|---|---|---|---|
| | Primary 0T 20° C. | Secondary 0T 20° C. | Primary 0T −15° C. | Primary | Secondary | Cross cut + SST | Cross cut + Er + SST | 0T + SST | |
| Example 45 | ◎ | ◎ | ○ | ◎ | ◎ | ◎ | ○ | ○ | ◎ |
| Example 46 | ◎ | ◎ | ○ | ◎ | ◎ | ◎ | ○ | ○ | ◎ |
| Example 47 | ◎ | ◎ | ○ | ◎ | ◎ | ◎ | ○ | ○ | ◎ |
| Example 48 | ◎ | ◎ | ○ | ◎ | ◎ | ◎ | ○ | ○ | ◎ |

The mean of each symbol (double circle, circle, triangle and cross) is shown in TABLE 8B.

TABLE 13A

| | Urethane resin (A) | | | | Silicon compound (B) | A/B | Tc | Tc/Ta |
|---|---|---|---|---|---|---|---|---|
| | Kind | Concentration of urethane group | Concentration of hydrophilic group | Ta | | | | |
| Example 49 | A18 | 3.83 | 0.7 | 98.6 | B1 | 1.5 | 176.2 | 1.8 |
| Example 50 | A19 | 3.65 | 0.7 | 94.8 | B1 | 1.5 | 174.7 | 1.8 |
| Example 51 | A20 | 3.65 | 0.75 | 94.9 | B1 | 1.5 | 174.7 | 1.8 |
| Example 52 | A21 | 3.66 | 0.72 | 104.5 | B1 | 1.5 | 178.6 | 1.7 |
| Example 53 | A22 | 3.52 | 0.72 | 101.5 | B1 | 1.5 | 177.4 | 1.7 |
| Example 54 | A23 | 3.53 | 0.76 | 101.6 | B1 | 1.5 | 177.5 | 1.7 |
| Example 55 | A24 | 3.83 | 0.74 | 98.5 | B1 | 1.5 | 176.2 | 1.8 |
| Example 56 | A25 | 3.49 | 0.75 | 91.6 | B1 | 1.5 | 173.4 | 1.9 |
| Example 57 | A26 | 3.36 | 0.72 | 88.9 | B1 | 1.5 | 172.3 | 1.9 |
| Example 58 | A34 | 3.39 | 0.58 | 89.5 | B1 | 1.5 | 172.6 | 1.9 |
| Example 59 | A35 | 3.59 | 0.5 | 93.6 | B1 | 1.5 | 174.2 | 1.9 |
| Example 60 | A36 | 3.51 | 0.42 | 92 | B1 | 1.5 | 173.6 | 1.9 |
| Example 61 | A46 | 3.17 | 0.83 | 93.7 | B1 | 1.5 | 174.2 | 1.9 |
| Example 62 | A47 | 3.16 | 0.85 | 93.3 | B1 | 1.5 | 174.1 | 1.9 |
| Example 63 | A48 | 3.13 | 0.84 | 92.6 | B1 | 1.5 | 173.8 | 1.9 |
| Example 64 | A49 | 3.18 | 0.83 | 93.8 | B1 | 1.5 | 174.3 | 1.9 |
| Example 65 | A50 | 3.06 | 0.88 | 82.8 | B1 | 1.5 | 169.8 | 2.1 |

TABLE 13A-continued

| | Urethane resin (A) | | | | | | | |
|---|---|---|---|---|---|---|---|---|
| | Kind | Concentration of urethane group | Concentration of hydrophilic group | Ta | Silicon compound (B) | A/B | Tc | Tc/Ta |
| Example 68 | A51 | 3.04 | 0.85 | 82.4 | B1 | 1.5 | 169.7 | 2.1 |
| Example 67 | A52 | 3.06 | 0.83 | 91.1 | B1 | 1.5 | 173.2 | 1.9 |

TABLE 13B

| | Bend adhesion | | | Scratch resistance | | Adhesion after corrosion resistant test | | | Storage stability |
|---|---|---|---|---|---|---|---|---|---|
| | Primary 0T 20° C. | Secondary 0T 20° C. | Primary 0T −15° C. | Primary | Secondary | Cross cut + SST | Cross cut + Er + SST | 0T + SST | |
| Example 49 | ⊚ | ⊚ | ○ | ⊚ | ⊚ | ⊚ | ⊚ | ⊚ | ⊚ |
| Example 50 | ⊚ | ⊚ | ○ | ⊚ | ⊚ | ⊚ | ⊚ | ⊚ | ⊚ |
| Example 51 | ⊚ | ⊚ | ○ | ⊚ | ⊚ | ⊚ | ⊚ | ⊚ | ⊚ |
| Example 52 | ⊚ | ⊚ | ○ | ⊚ | ⊚ | ⊚ | ⊚ | ⊚ | ⊚ |
| Example 53 | ⊚ | ⊚ | ○ | ⊚ | ⊚ | ⊚ | ⊚ | ⊚ | ⊚ |
| Example 54 | ⊚ | ⊚ | ○ | ⊚ | ⊚ | ⊚ | ⊚ | ⊚ | ⊚ |
| Example 55 | ⊚ | ⊚ | ○ | ⊚ | ⊚ | ⊚ | ⊚ | ⊚ | ⊚ |
| Example 56 | ⊚ | ⊚ | ○ | ⊚ | ⊚ | ⊚ | ⊚ | ⊚ | ⊚ |
| Example 57 | ⊚ | ⊚ | ○ | ⊚ | ⊚ | ⊚ | ⊚ | ⊚ | ⊚ |
| Example 58 | ⊚ | ⊚ | ○ | ⊚ | ⊚ | ⊚ | ⊚ | ⊚ | ⊚ |
| Example 59 | ⊚ | ⊚ | ○ | ⊚ | ⊚ | ⊚ | ⊚ | ⊚ | ⊚ |
| Example 60 | ⊚ | ⊚ | ○ | ⊚ | ⊚ | ⊚ | ⊚ | ⊚ | ⊚ |
| Example 61 | ⊚ | ⊚ | ○ | ⊚ | ⊚ | ⊚ | ⊚ | ⊚ | ⊚ |
| Example 62 | ⊚ | ⊚ | ○ | ⊚ | ⊚ | ⊚ | ⊚ | ⊚ | ⊚ |
| Example 63 | ⊚ | ⊚ | ○ | ⊚ | ⊚ | ⊚ | ⊚ | ⊚ | ⊚ |
| Example 64 | ⊚ | ⊚ | ○ | ⊚ | ⊚ | ⊚ | ⊚ | ⊚ | ⊚ |
| Example 65 | ⊚ | ⊚ | ○ | ⊚ | ⊚ | ⊚ | ⊚ | ⊚ | ⊚ |
| Example 66 | ⊚ | ⊚ | ○ | ⊚ | ⊚ | ⊚ | ⊚ | ⊚ | ⊚ |
| Example 67 | ⊚ | ⊚ | ○ | ⊚ | ⊚ | ⊚ | ⊚ | ⊚ | ⊚ |

The mean of each symbol (double circle, circle, triangle and cross) is shown in TABLE 8B.

TABLE 14A

| | Urethane resin (A) | | | | | | | |
|---|---|---|---|---|---|---|---|---|
| | Kind | Concentration of urethane group | Concentration of hydrophilic group | Ta | Silicon compound (B) | A/B | Tc | Tc/Ta |
| Example 4 | A12 | 3.39 | 0.71 | 89.6 | B1 | 1.5 | 172.6 | 1.9 |
| Example 68 | A12 | 3.39 | 0.71 | 89.6 | B2 | 1.5 | 172.6 | 1.9 |
| Example 69 | A12 | 3.39 | 0.71 | 89.6 | B3 | 1.5 | 172.6 | 1.7 |
| Example 70 | A12 | 3.39 | 0.71 | 89.6 | B4 | 1.5 | 172.6 | 1.3 |
| Comparative Example 11 | A12 | 3.39 | 0.71 | 89.6 | B5 | 1.5 | 172.6 | 1.3 |
| Comparative Example 12 | A12 | 3.39 | 0.71 | 89.6 | B6 | 1.5 | 172.6 | 1.3 |

TABLE 14B

| | Bend adhesion | | | Scratch resistance | | Adhesion after corrosion resistant test | | | Storage stability |
|---|---|---|---|---|---|---|---|---|---|
| | Primary 0T 20° C. | Secondary 0T 20° C. | Primary 0T −15° C. | Primary | Secondary | Cross cut + SST | Cross cut + Er + SST | 0T + SST | |
| Example 4 | ⊚ | ⊚ | ○ | ⊚ | ⊚ | ⊚ | ⊚ | ⊚ | ⊚ |
| Example 68 | ⊚ | ⊚ | ○ | ⊚ | ⊚ | ⊚ | ⊚ | ⊚ | ⊚ |
| Example 69 | ⊚ | ⊚ | ○ | ⊚ | ⊚ | ⊚ | ○ | ○ | ⊚ |
| Example 70 | ⊚ | ⊚ | ○ | ⊚ | ⊚ | ⊚ | ○ | ○ | ⊚ |

TABLE 14B-continued

| | Bend adhesion | | | Scratch resistance | | Adhesion after corrosion resistant test | | | Storage stability |
| | Primary 0T 20° C. | Secondary 0T 20° C. | Primary 0T −15° C. | Primary | Secondary | Cross cut + SST | Cross cut + Er + SST | 0T + SST | |
|---|---|---|---|---|---|---|---|---|---|
| Comparative Example 11 | Δ | X | X | Δ | Δ | X | X | X | ○ |
| Comparative Example 12 | Δ | Δ | X | Δ | Δ | Δ | X | X | ○ |

The mean of each symbol (double circle, circle, triangle and cross) is shown in TABLE 8B.

TABLE 15A

| | Adhesion layer | | Intermediate layer | | Upper layer | |
|---|---|---|---|---|---|---|
| | Composition | Film thickness mg/m² | Kind | Film thickness μm | Kind | Film thickness μm |
| Example 11 | Same with Example 11 | 100 | T1 | 8 | U1 | 20 |
| Example 71 | Same with Example 11 | 50 | T1 | 8 | U1 | 20 |
| Example 72 | Same with Example 11 | 200 | T1 | 8 | U1 | 20 |
| Example 73 | Same with Example 11 | 500 | T1 | 8 | U1 | 20 |
| Example 74 | Same with Example 11 | 100 | T1 | 8 | U2 | 20 |
| Example 75 | Same with Example 11 | 100 | T2 | 8 | U1 | 20 |
| Example 76 | Same with Example 11 | 100 | — | — | U1 | 20 |

TABLE 15B

| | Bend adhesion | | | Scratch resistance | | Adhesion after corrosion resistant test | | | Storage stability |
| | Primary 0T 20° C. | Secondary 0T 20° C. | Primary 0T −15° C. | Primary | Secondary | Cross cut + SST | Cross cut + Er + SST | 0T + SST | |
|---|---|---|---|---|---|---|---|---|---|
| Example 11 | ◎ | ◎ | ◎ | ◎ | ◎ | ◎ | ◎ | ◎ | ◎ |
| Example 71 | ◎ | ◎ | ◎ | ◎ | ◎ | ◎ | ◎ | ◎ | ◎ |
| Example 72 | ◎ | ◎ | ◎ | ◎ | ◎ | ◎ | ◎ | ◎ | ◎ |
| Example 73 | ◎ | ◎ | ○ | ◎ | ○ | ◎ | ◎ | ○ | ◎ |
| Example 74 | ◎ | ◎ | ◎ | ◎ | ◎ | ◎ | ◎ | ◎ | ◎ |
| Example 75 | ◎ | ◎ | ◎ | ◎ | ◎ | ◎ | ◎ | ◎ | ◎ |
| Example 76 | ◎ | ◎ | ◎ | ○ | ○ | ◎ | ◎ | ◎ | ◎ |

The mean of each symbol (double circle, circle, triangle and cross) is shown in TABLE 8B.

TABLE 16A

| | Adhesion layer | | Intermediate layer | | Upper layer | |
|---|---|---|---|---|---|---|
| | Reference | Example No | Kind | Film thickness μm | Kind | Film thickness μm |
| Comparative Example 13 | JP 2001-9368 A | Example 5 | T1 | 8 | U1 | 20 |
| Comparative Example 14 | JP 2006-77077 A | Example 8 | T1 | 8 | U1 | 20 |

TABLE 16A-continued

| | Adhesion layer | | Intermediate layer Film | | Upper layer Film | |
|---|---|---|---|---|---|---|
| | Reference | Example No | Kind | thickness μm | Kind | thickness μm |
| Comparative Example 15 | JP 2006-239622 A | Example 4 | T1 | 8 | U1 | 20 |
| Comparative Example 16 | JP 2007-51323 A | Example 1 | T1 | 8 | U1 | 20 |
| Comparative Example 17 | JP 2000-1647 A | Example 2 | T1 | a | U1 | 20 |
| Comparative Example 18 | JP 2001-64346 A | Example 4 | T1 | 8 | U1 | 20 |
| Comparative Example 19 | JP 2007-38652 A | Example 10 | Tl | 8 | U1 | 20 |
| Comparative Example 20 | JP 2008-25023 A | Example 13 | T1 | 8 | U1 | 20 |

TABLE 16B

| | Bend adhesion | | | Scratch resistance | | Adhesion after corrosion resistant test | | | Storage stability |
|---|---|---|---|---|---|---|---|---|---|
| | Primary 0T 20° C. | Secondary 0T 20° C. | Primary 0T −15° C. | Primary | Secondary | Cross cut + SST | Cross cut + Er + SST | 0T + SST | |
| Comparative Example 13 | Δ | Δ | X | Δ | Δ | Δ | Δ | X | Δ |
| Comparative Example 14 | X | X | X | X | X | ○ | Δ | X | ○ |
| Comparative Example 15 | ◎ | ◎ | ○ | ○ | ○ | Δ | X | X | Δ |
| Comparative Example 16 | Δ | Δ | X | X | X | ○ | ○ | X | Δ |
| Comparative Example 17 | Δ | X | X | X | X | Δ | Δ | X | X |
| Comparative Example 18 | ○ | ○ | Δ | ○ | Δ | Δ | X | X | Δ |
| Comparative Example 19 | Δ | X | X | ○ | ○ | ○ | ○ | Δ | ○ |
| Comparative Example 20 | ○ | ○ | X | Δ | Δ | ○ | ○ | Δ | ○ |

The mean of each symbol (double circle, circle, triangle and cross) is shown in TABLE 8B.

The invention claimed is:

1. A composition for adhesion layer which is used for obtaining a multi-layered surface treatment steel sheet including:
an aqueous medium;
a cationic urethane resin (A); and
a silicon compound (B) represented by the following general formula (I), and
wherein the ratio (Tc/Ta) between the temperature (Tc) and the temperature (Ta) is in the range of 1.8 to 2.2, wherein the temperature (Tc) being represented in the case where the logarithmic decrement for the mixture (C) of the cationic urethane resin (A) and the silicon compound (B) in the rigid-body pendulum type free damped vibration method is the maximum value, and the temperature (Ta) being represented in the case where the logarithmic decrement for the cationic urethane resin (A) alone in the rigid-body pendulum type free damped vibration method is the maximum value,
solid content mass ratio (A/B) between the cationic urethane resin (A) and the silicon compound (B) represented by the general formula (I) is in the range of 1.2 to 1.5, and
the cationic urethane resin (A) contains tertiary amine and/or quaternary ammonium; the concentration of urethane groups is in the range of 1.0 mmol/g to 5.0 mmol/g, and the concentration of hydrophilic groups which comprise the tertiary amine and/or the quaternary ammonium is in the range of 0.3 mmol/g to 2.0 mmol/g, General Formula I

wherein, $R_1$ to $R_3$ represent mutually independently an alkyl group having a carbon number of 1 to 4 or an alkoxy group having a carbon number of 1 to 4, at least two of $R_1$ to $R_3$ being the alkoxy groups; $R_4$ represents an alkylene group having a carbon number of 2 to 6; and $R_5$ represents amino group or N-2(aminoethyl)amino group.

2. The composition for adhesion layer according to claim 1, wherein the Ta of the cationic urethane resin (A) is in the range of 40° C. to 140° C.

3. The composition for adhesion layer according to claim 1, wherein the silicon compound (B) is at least one selected from 3-aminopropyltrimethoxysilane, 3-aminopropyltriethoxysilane or 3-aminopropylmonomethyldiethoxysilane.

4. The composition for adhesion layer according to claim 1, wherein the composition for adhesion layer contains only the aqueous medium, the urethane resin (A), and the silicon compound (B).

5. The composition for adhesion layer according to claim 1, wherein the cationic urethane resin (A) has alicyclic structure in its skeleton.

6. A composition for adhesion layer which is used for obtaining a multi-layered surface treatment steel sheet in which an adhesion layer (S) is formed onto at least one surface of a steel sheet, and an upper layer and/or an intermediate layer (T) which has a design and which contains a rust preventive pigment and/or colored pigment is formed onto the adhesion layer (S), the composition for adhesion layer including:
- an aqueous medium;
- a cationic urethane resin (A); and
- a silicon compound (B) represented by the following general formula (I), and
- wherein the ratio (Tc/Ta) between the temperature (Tc) and the temperature (Ta) is in the range of 1.8 to 2.2, wherein the temperature (Tc) being represented in the case where the logarithmic decrement for the mixture (C) of the cationic urethane resin (A) and the silicon compound (B) in the rigid-body pendulum type free damped vibration method is the maximum value, and the temperature (Ta) being represented in the case where the logarithmic decrement for the cationic urethane resin (A) alone in the rigid-body pendulum type free damp vibration method is the maximum value,
- solid content mass ratio (A/B) between the cationic urethane resin (A) and the silicon compound (B) represented by the general formula (I) is in the range of 1.2 to 1.5, and
- the cationic urethane resin (A) contains tertiary amine and/or quaternary ammonium; the concentration of urethane groups is in the range of 1.0 mmol/g to 5.0 mmol/g, and the concentration of hydrophilic groups which comprise the tertiary amine and/or the quaternary ammonium is in the range of 0.3 mmol/g to 2.0 mmol/g,

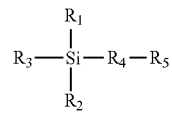

General Formula I wherein $R_1$ to $R_3$ represent mutually independently an alkyl group having a carbon number of 1 to 4 or an alkoxy group having a carbon number of 1 to 4, at least two of $R_1$ to $R_3$ being the alkoxy groups; $R_4$ represents an alkylene group having a carbon number of 2 to 6; and $R_5$ represents amino group or N-2(aminoethyl) amino group.

* * * * *